Aug. 14, 1956  R. CLARET ET AL  2,758,377
NAVIGATION INSTRUMENT
Filed Nov. 12, 1952  16 Sheets-Sheet 1

INVENTORS
RENÉ CLARET
JEAN BOUZITAT
Pennie, Edmonds, Morton, Barrows and Taylor
ATTORNEYS Aug. 14, 1956          R. CLARET ET AL          2,758,377
                       NAVIGATION INSTRUMENT
Filed Nov. 12, 1952                          16 Sheets-Sheet 4

INVENTORS
RENÉ CLARET
JEAN BOUZITAT
Pennie, Edmonds, Morton, Barrows and Taylor
ATTORNEYS

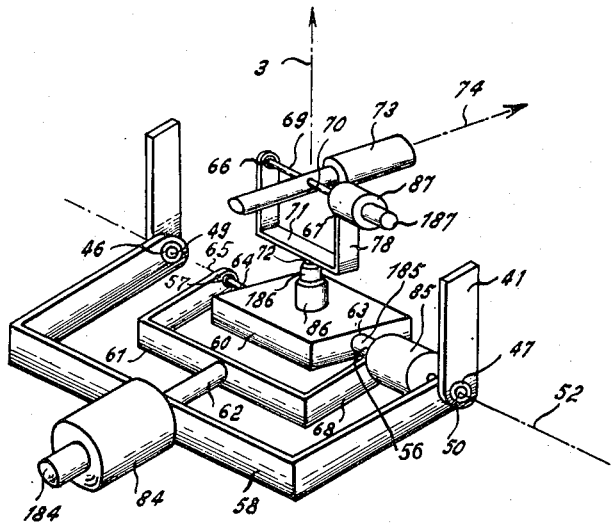
Fig:5
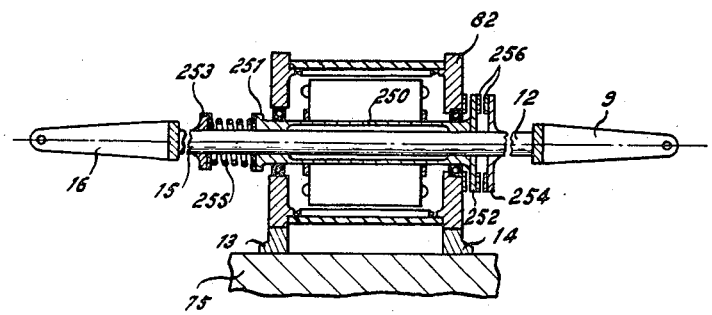
Fig:14
INVENTORS
RENÉ CLARET
JEAN BOUZITAT
Pennie, Edmonds, Morton, Barrows and Taylor
ATTORNEYS

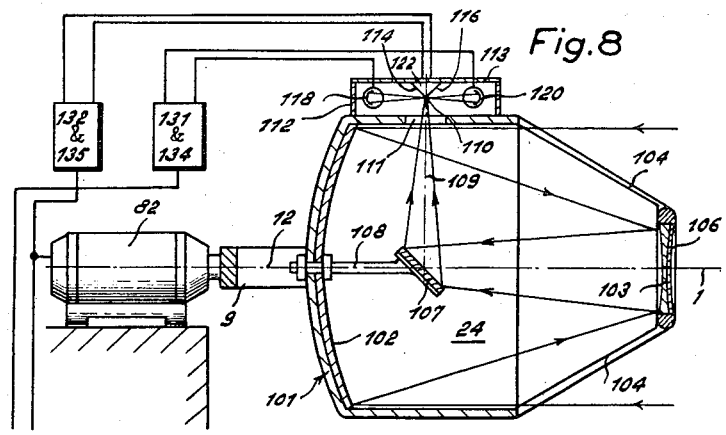
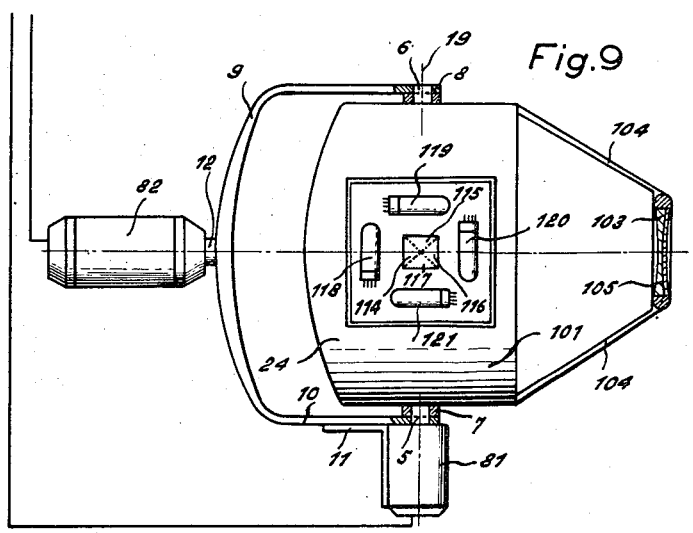

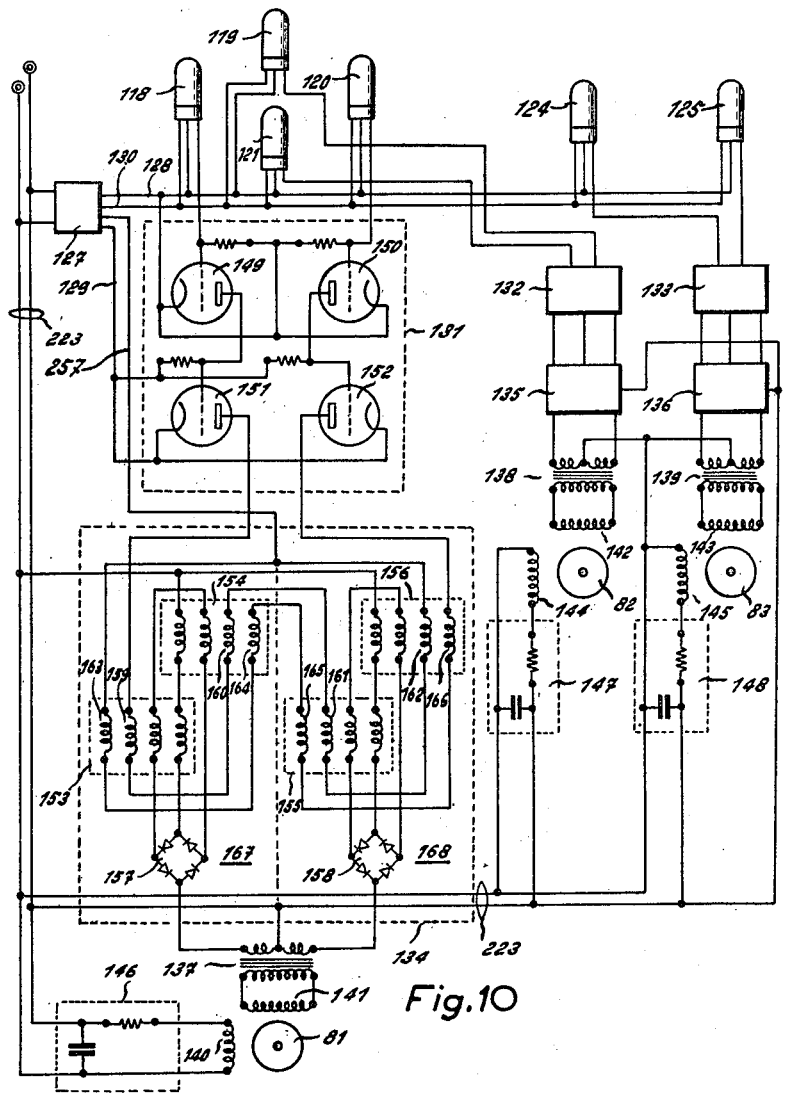

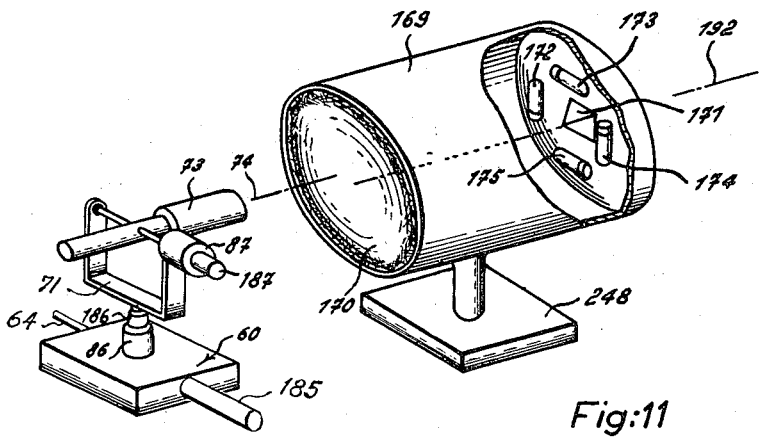

Aug. 14, 1956  R. CLARET ET AL  2,758,377
NAVIGATION INSTRUMENT
Filed Nov. 12, 1952  16 Sheets-Sheet 10

INVENTORS
RENÉ CLARET
JEAN BOUZITAT

Pennie, Edmonds, Morton, Barrows and Taylor
ATTORNEYS

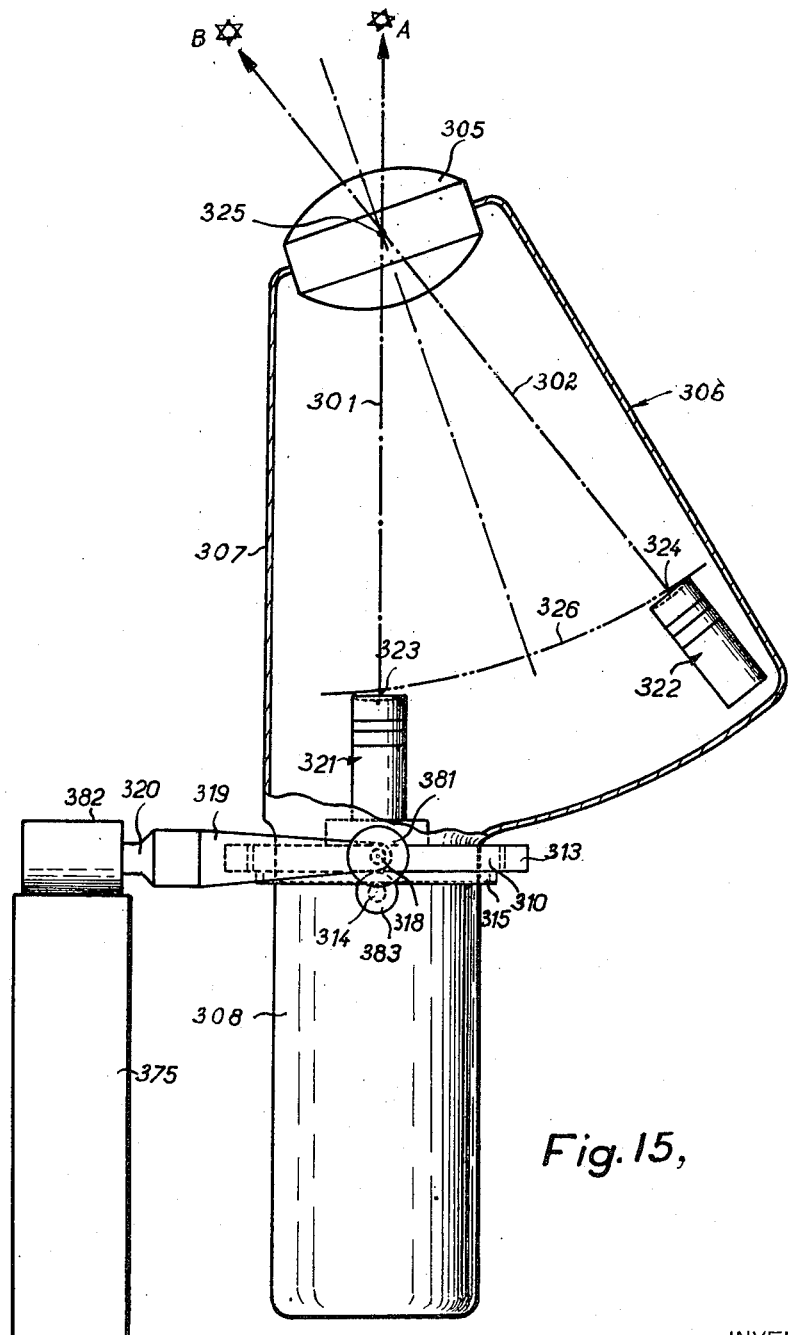
Fig. 15,

Aug. 14, 1956 R. CLARET ET AL 2,758,377
NAVIGATION INSTRUMENT
Filed Nov. 12, 1952 16 Sheets-Sheet 12
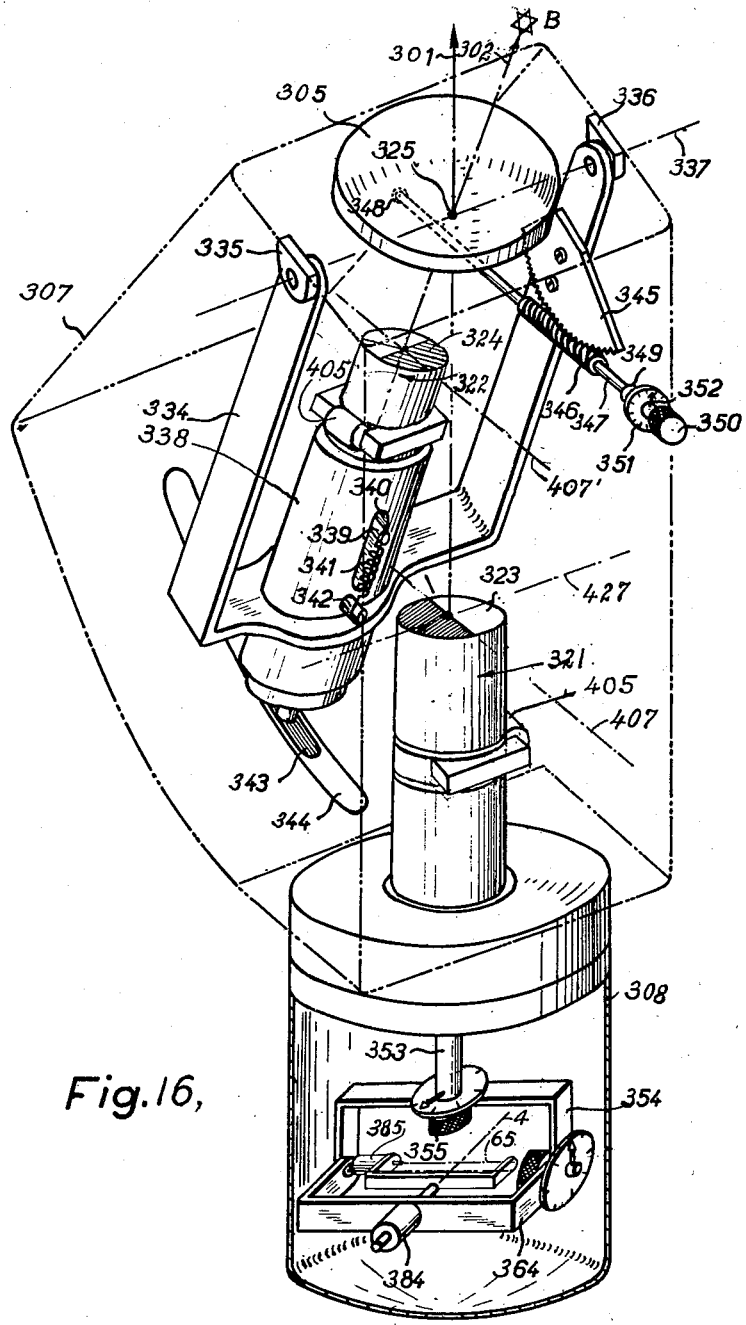
Fig.16,
INVENTORS
RENÉ CLARET
JEAN BOUZITAT
BY
Pennie, Edmonds, Morton, Barrows and Taylor
ATTORNEYS Aug. 14, 1956   R. CLARET ET AL   2,758,377
NAVIGATION INSTRUMENT
Filed Nov. 12, 1952   16 Sheets-Sheet 13
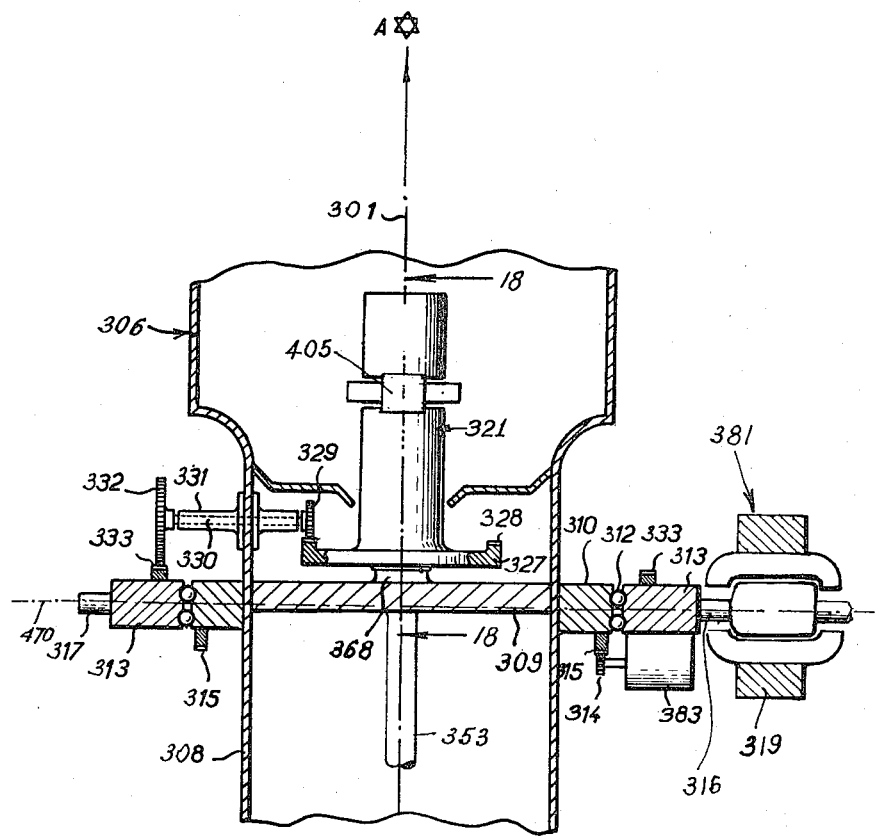
Fig. 17,
INVENTORS
RENE CLARET
JEAN BOUZITAT
BY
Pennie, Edmonds, Morton, Barrows and Taylor
ATTORNEYS Aug. 14, 1956  R. CLARET ET AL  2,758,377
NAVIGATION INSTRUMENT
Filed Nov. 12, 1952  16 Sheets-Sheet 14
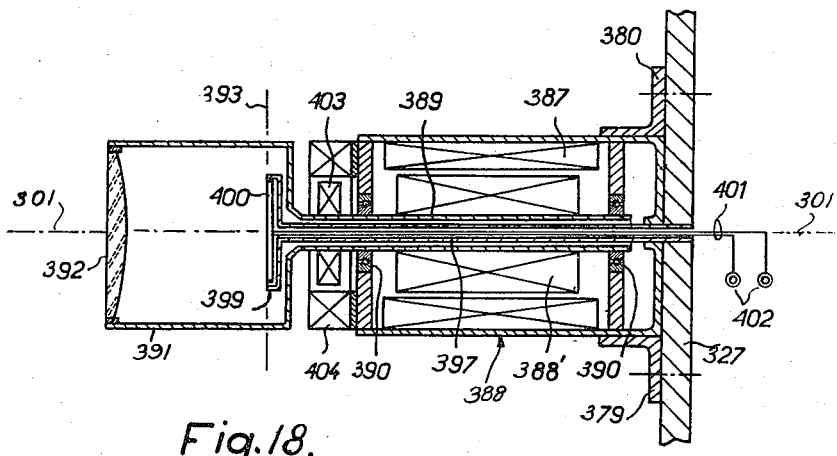
Fig. 18,
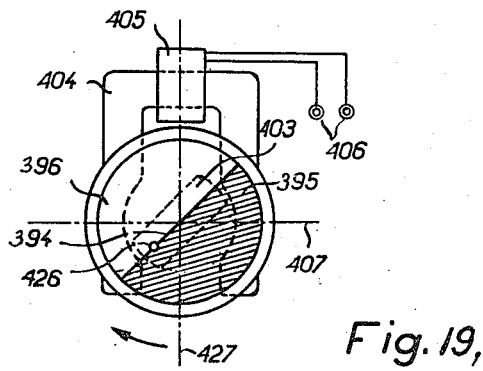
Fig. 19,
INVENTORS
RENÉ CLARET
JEAN BOUZITAT
BY
*Pennie, Edmonds, Morton, Barrows and Taylor*
ATTORNEYS

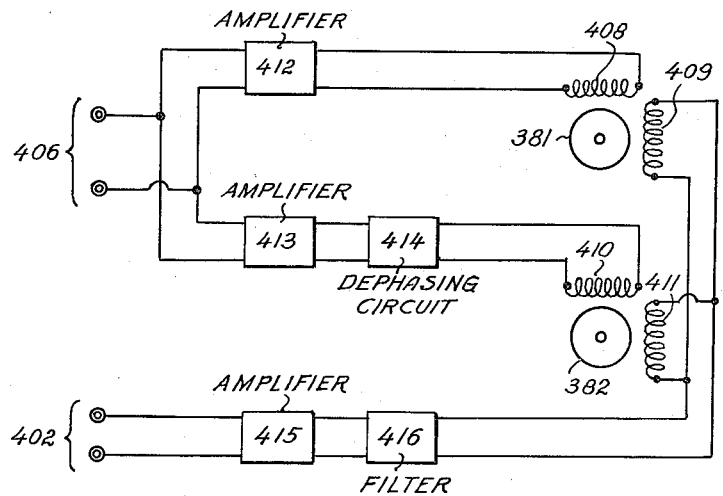
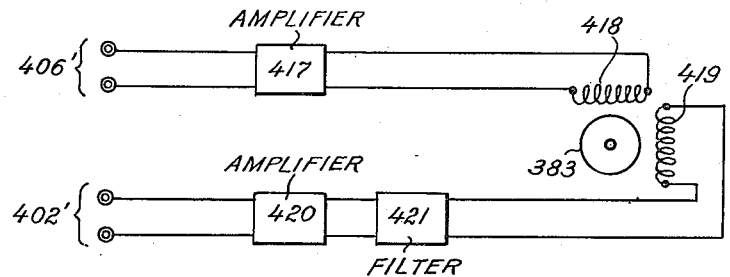
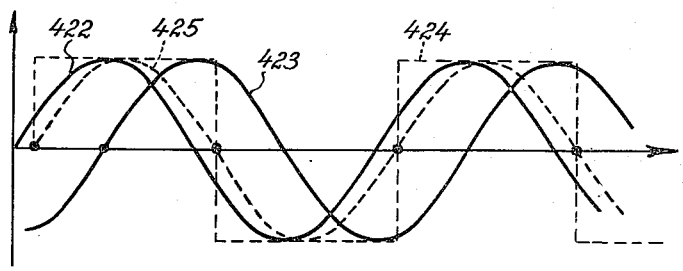

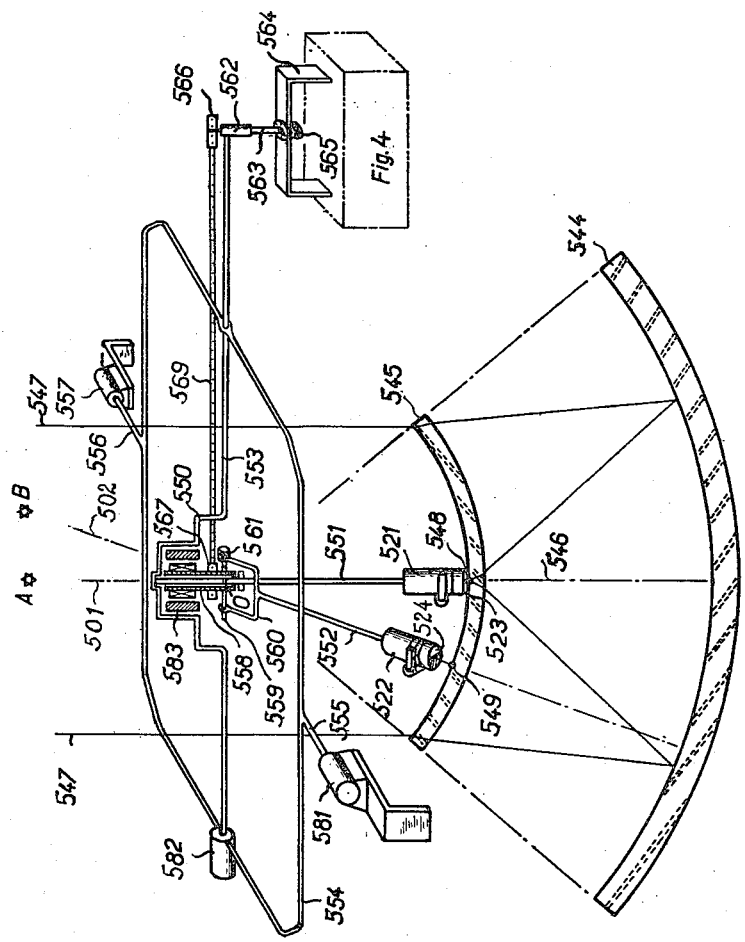

United States Patent Office 2,758,377
Patented Aug. 14, 1956

2,758,377

NAVIGATION INSTRUMENT

René Claret and Jean Bouzitat, Paris, France, assignors to Office National d'Etudes et de Recherches Aeronautics, Seine, France, a French company Application November 12, 1952, Serial No. 319,850

Claims priority, application France April 9, 1951

15 Claims. (Cl. 33—61)

The present invention relates to instruments for astronomical navigation. The invention provides an instrument for astronomical navigation including one or more image-forming devices and two optical image detectors and error signal generators which cooperate with the image-forming device or devices for the simultaneous tracking of two separate celestial bodies and for definition of the lines of sight thereto, and which presents continuously and automatically the longitude and latitude of the instrument, which may be mounted on a moving vehicle, for example.

The present application is a continuation in part of our copending application Serial No. 278,874, filed March 27, 1952, now abandoned.

In astronomical navigation instruments of this type of the prior art, one or the other of two separate methods has been employed to determine the polar axis of the celestial sphere from astronomical data obtained by the instrument. In one known form of navigation instrument a magnetic compass is used to indicate the North direction. The meridian plane of the position of the instrument is then determined by the vertical and by the North direction. With this plane, which contains the axis of the poles, the direction of the polar axis may be determined with the help of a single star-following telescope rotatable about a first horizontal East-West axis and about a second axis perpendicular to the first, the optical axis of the telescope being set at an inclination to this second axis of rotation equal to the complement of the declination of the star being tracked. When the telescope is directed toward the chosen star, the direction of its second axis of rotation is parallel to the polar axis, and the polar axis is thus determined.

Another form of instrument heretofore proposed operates without reliance upon magnetic compasses. In instruments of this type, the polar axis is determined by observing the zenith distances of two celestial bodies of known declination and by solving in a computer the spherical quadrilateral, the intersections of whose sides are formed by the zenith point of the position of the instrument, by the two celestial bodies, and by one of the unknown poles of the celestial sphere. In this quadrilateral the four sides and one of the angles are known, since the two sides intersecting at the zenith of the instrument are equal to the zenith distances of the two stars and the two sides intersecting at the pole are equal to the complements of the declinations of these stars; whereas the angle between the latter two sides is equal to the difference between the right ascensions of those two stars.

In these two types of instrument it is necessary that the star-following telescopes be mounted on a horizontally stabilized platform. In view of the considerable weight of the telescopes, the physical realization of such a platform is difficult, and its departures from the horizontal introduce substantial errors into the data obtained from the instrument. Moreover, if there is to be achieved independence of the magnetic compass element, whose precision of angular indication is much less than that of optical instruments, it is necessary to provide two star-tracking telescopes each having two degrees of freedom with respect to the fixed part of the instrument.

An object of the present invention is to provide an astronomical navigation instrument giving the longitude and latitude of a moving vehicle with precision of the order of a minute of arc.

Another object of the present invention is to provide an astronomical navigation instrument including two optical star-tracking devices whose axes of rotation may be arbitrarily chosen, so as to obviate the necessity for a stabilized horizontal platform for the mounting of the devices, which may for example take the form of telescopes.

Another object of the present invention is to provide an astronomical navigation instrument in which one of the two star-tracking devices is mounted with two degrees of freedom, whereas the second, whose axis is inclined at a fixed angle to the axis of the first, possesses a single degree of freedom, namely that of rotation about the axis of the first.

Another object of the present invention is to provide an astronomical navigation instrument which will indicate automatically and continuously in addition to the coordinates of its own position the heading and the inclination with respect to the horizontal of the vehicle on which it is mounted, these two data being given with a precision of the order of a minute of arc.

According to the invention, there are selected for tracking by the two star-tracking devices two stars of known angular separation and having a known angle between the celestial meridian of one thereof and the great circle passing through the two. These angles constitute input data to the instrument, establishing an initial adjustment so that it may correctly operate on the selected stars.

The two star-tracking devices comprise each an optical image-forming device and a photoelectric detector supported at or close to the focal surface of the image-forming device. In some embodiments of the invention a single image-forming device may be common to both of the star-tracking devices. One detector (and, in some embodiments, its associated image-forming device) is movably mounted in a base or other frame of reference for rotation with two degrees of freedom, i. e. for two independent rotations, with respect to the base. This detector with its associated image-forming device defines an optical axis having the same degrees of freedom as the detector. By means of error signal generating apparatus and a servosystem associated with the detector, this detector is caused to move so as to maintain its optical axis parallel to the line of sight to one of the stars, which may be called the first or primary star. The second detector (and, in some embodiments, its associated image-forming device, if different from that associated with the first detector) is movably mounted with one degree of rotational freedom with respect to the first detector, for rotation about the optical axis associated with the first detector. The second detector and its image-forming device then define a second optical axis rotatable about the first. The second detector can be adjustably fixed with reference to the first so as to incline the two optical axes to each other by a desired angle, and an error signal generating apparatus and servosystem adjust the position of the second detector to maintain the optical axis associated therewith parallel to the line of sight to the second star. For convenience each detector with its image-forming device may be referred to as a star-tracking telescope, although as will subsequently appear the combination of detector and image-forming device may depart widely in structure from a telescope in the usual sense.

The optical axis of the first of the two star-tracking telescopes is then continuously directed toward the first star, and the optical axis of the second telescope is continuously directed toward the second star. The plane of the telescope axes (i. e. of their optical axes in their object spaces) is physically embodied in an articulated mechanical system linked to the telescopes, and from this plane the meridian plane of the first star is located by a rotation from this plane about the line of sight to that star, the amount of this rotation being equal to the angle between the meridian plane of the first star and the great circle joining the two stars. Lastly in the meridian plane of the first star the direction of the polar axis is determined as the direction which makes with the axis of the first telescope an angle equal to the complement of the declination of the first star.

The invention may be embodied in apparatus of widely differing forms. In particular, the star-tracking devices may be of very different types in different embodiments.

Other objects and features of the instrument of the invention will appear from the following detailed description of a preferred embodiment thereof which is to be taken in conjunction with the accompanying drawings in which:

Fig. 5 is a view similar to that of Fig. 4 but showing further a portion of certain apparatus which may be incorporated in the instrument of the invention for the derivation of course and inclination information;

Figure 2:
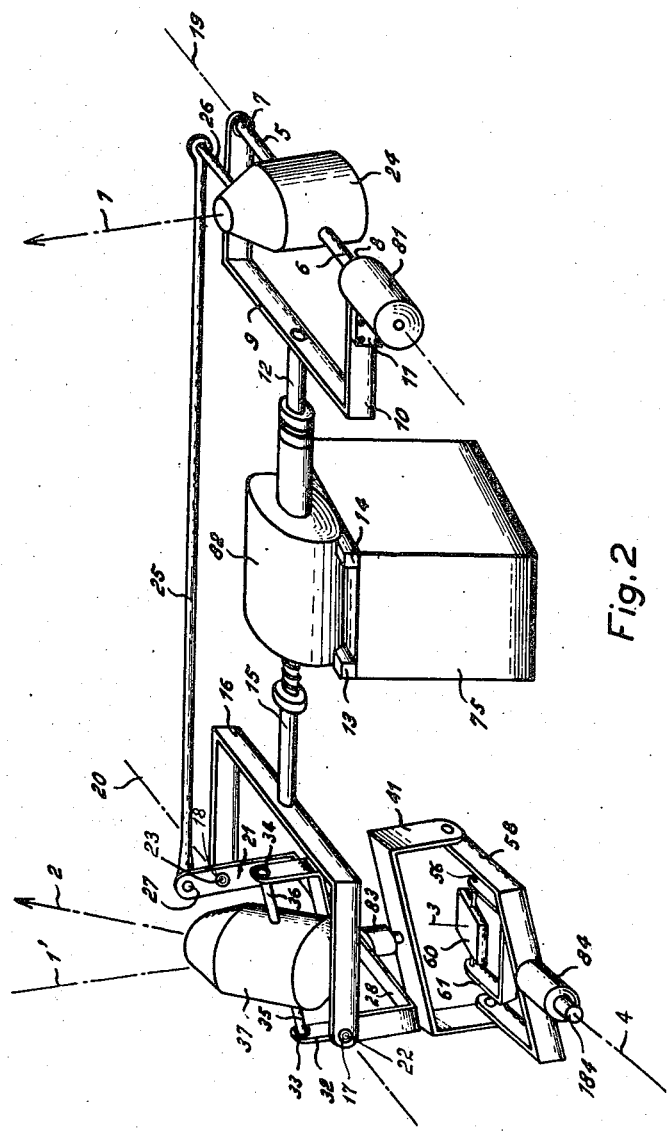
Fig. 2 is a perspective view of an instrument embodying the invention, certain elements shown in other figures being omitted for the sake of clarity.
Figure 13:
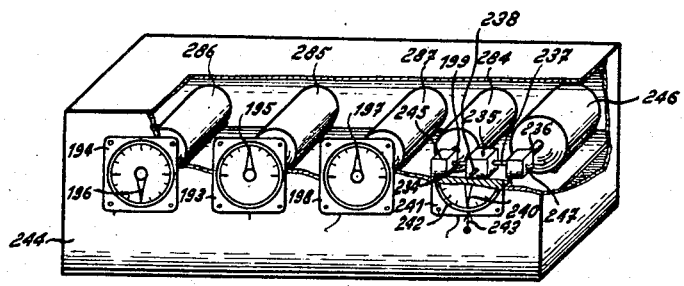

Figs. 8 and 9 are respectively sectional elevation and plan views of a star-tracking telescope suitable for use as the primary star-tracking telescope in the embodiment of the invention shown in Fig. 2, showing in particular photoelectric means effecting automatic tracking of a star thereby. A respective view of a telescope suitable for use as the secondary star-tracking telescope of this embodiment is contained in Fig. 3;

Fig. 10 is a schematic diagram of the servomechanisms which control the positioning of the two star-tracking telescopes, together with their associated circuits;

Fig. 11 is a perspective view of elements which may be included in the instrument of the invention to determine the heading and the inclination with respect to the horizontal of a vehicle in which the instrument of the invention may be mounted;

Fig. 12 is a schematic diagram of the circuits associated with the device of Fig. 11;

Fig. 13 is a perspective view, partly cut away, of an indicator device for presenting the data obtained by the instrument of Figs. 2 to 12;

Fig. 14 is a sectional view on the line 14—14 of Fig. 2 illustrating the frictional drive of the two star-tracking telescopes about one of their two common axes of rotation with respect to the vehicle in which the instrument is mounted;

Fig. 15 is a schematic view in side elevation, partly broken away showing a modified instrument embodying the invention, certain elements being omitted for clarity;

Fig. 16 is a perspective view of the instrument of Fig. 15;

Fig. 17 is a fragmentary view of the instrument of Fig. 15, the housing thereof being broken away to show in elevation the primary star light detector and error signal generating system;

Fig. 18 is a fragmentary sectional view taken on the line 18—18 of Fig. 17;

Fig. 19 is a plan view of the light detector and error signal generator seen in section in Fig. 18;

Fig. 20 is a diagrammatic representation of the control circuits for the slewing motor which cause the primary star-tracking device in the embodiment of Figs. 15 and 16 to follow the primary star;

Fig. 21 is a diagrammatic view illustrating the control circuits for the slewing motor which causes the secondary star-tracking device in the embodiment of Figs. 15 and 16 to follow the secondary star;

Fig. 22 is a diagrammatic representation of certain electrical wave forms useful in explaining the operation of the circuits of Figs. 21 and 22; and Fig. 23 is a diagrammatic representation of a further modified form of instrument according to the invention.

The principle of position determination employed in the instrument of the invention will now be explained with reference to Fig. 1, which illustrates the celestial sphere. On this sphere Z is the zenith point of the position of the instrument, and A and B are two celestial bodies or stars to be employed in position determination. P and P' are the celestial poles, E is the celestial equator and T is the center of the celestial sphere.

The body A, selected as the primary star, is positioned in terms of its right ascension $AR_A$ measured along the celestial equator from the vernal point $\gamma$ to its own meridian, and in terms of its declination $\delta_A$, measured along its meridian from the plane of the celestial equator.

The position of the body B, chosen as secondary star, is determined with respect to the star A by the arc AB of the great circle joining the two and by the dihedral angle BAP between the meridian plane of A and the great circle of arc AB.

The stars to be employed for position determination with the instrument of the invention are preferably chosen among the most brilliant in the heavens, for example among those of magnitude below the first or second magnitudes. Moreover, there should be chosen for the two stars of any pair only stars whose angular separation falls within certain limits dependent upon the desired precision in the results to be obtained. The number of pairs of stars A and B which can be used is consequently limited. For each pair the arc AB and the angle BAP are computed from the equatorial celestial coordinates of the two stars as obtained from a star catalogue such as the Nautical Ephemeris. The table gives the values of these parameters for several pairs of stars. Of course one can in each of these pairs choose either one or the other of the two stars as the primary star A.

Table

| Stars | | | | | BAP is positive in the direct sense | | |
|---|---|---|---|---|---|---|---|
| A | $AR_A$ | $\frac{\pi}{2}-\delta_A$ | Magnitude | B | Achernar | Altair | Betelgeuse |
| Achernar | 23° 56′ | 147° 31′ | 0.6 | AB | | 95° 41′ | 82° 54′. |
| Altair | 297° 03′ | 81° 17′ | 0.9 | BAP | | −82° 41′ | +64° 04′. |
| | | | | AB | 95° 41′ | | Not usable. |
| Betelgeuse | 88° 05′ | 82° 36′ | 0.1 | BAP | 147° 23′ | | |
| | | | | AB | 82° 54′ | Not usable. | |
| | | | | BAP | −150° 51′ | | |

The line of sight to the star A is determined by one of the star-tracking devices of the instrument, namely that which is mounted with two rotational degrees of freedom and which will hereinafter sometimes be referred to as the primary star telescope. The line of sight to the secondary star B is determined by a secondary star-tracking device or telescope mounted in the instrument in such a fashion that its optical axis makes with the axis of the primary star telescope an angle equal to the angle of separation AB of the two stars. Consequently the secondary star telescope is mounted in the instrument with a single rotational degree of freedom.

When the instrument is properly aligned, as it permanently is when in use, with the two telescopes pointed at their respective stars, the axis 1 of the primary star telescope determines at every instant the direction TA. The axis 2 of the secondary star telescope similarly determines at every instant the direction TB. In the instrument of the invention the direction 4 of the axis of the poles PP′ is determined by rotating about the axis TA the half plane TAB through an angle equal to the dihedral angle BAP, and by rotating the direction TA in the plane TAP through an angle equal to the complement of the declination $\delta_A$. The first rotation derives the meridian plane of the primary star A, and the second rotation determines the line of direction 4 of the axis of the poles PP′. The direction 3 of the vertical at the position of the instrument together with the polar axis defines the meridian plane of that position.

Given the right ascension $AR_A$ of the primary star A, Greenwich sidereal time $T_{SO}$, and the local hour angle $AH_{AZ}$ of the star A at the position of Z, i. e. the angle between the meridians of A and Z, the longitude of the instrument is given by the Equation 1.

$$L = T_{SO} - AR_A - AH_{AZ} \qquad (1)$$

Figure 1:
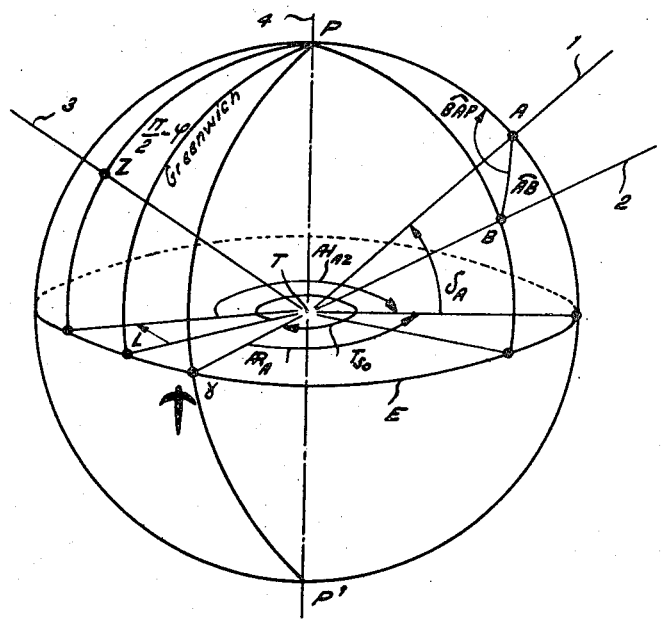
Fig. 1 is a schematic diagram setting forth the principles of spherical triangulation upon which the invention is based.

In this equation the usual sign conventions are adopted, for which all the angles shown in Fig. 1 are positive. The latitude $\phi$ will be given by the complement of the angle formed between the vertical direction TZ and the polar axis.

It is to be noted that in contrast with instruments of the prior art, the star-tracking telescopes are not employed to introduce into a computer certain astronomical data of the stars being tracked, such as local hour angles or zenith distances. Rather they serve only to define the plane TAB and a direction TA in this plane. Starting from this plane and this direction the polar axis is determined by rotations through known angles which are determined by the stars selected. It is therefore unnecessary to provide for one or the other of the mechanical axes of the instrument about which the primary star telescope is rotated to keep it on star A, a preferred direction such as the horizontal for example, and it is unnecessary to mount this telescope on a stabilized platform. Another advantage of the invention resides in the fact that the secondary star telescope has only a single degree of freedom. The servosystem for controlling the motions of the telescopes is therefore much simplified, and there are avoided the difficulties which follow from a superfluity of input data.

Referring now to Figs. 2, 3, 4 and 5, the primary star telescope 24 is provided with two trunnions 5 and 6 adapted to turn in bearings 7 and 8 formed in a fork 9. These trunnions and bearings define an axis 19. A motor 81 supported on a bracket 11 affixed to the branch 10 of the fork 9 is provided for rotation of the telescope 24 about the axis 19.

Fork 9 is affixed to a shaft 12 which is in turn affixed to the rotor of a motor 82, fixedly supported at abutments 13 and 14 on a pedestal 75 which is fixed with respect to the vehicle whose position is to be determined.

The shaft 12 is extended on the opposite side of motor 82 by means of a shaft 15 which carries at its end a fork 16 whose plane, as determined by bearings 17 and 18 (Fig. 3) and by the axis of shafts 12 and 15, coincides with that of the fork 9. Bearings 17 and 18 in the fork 16 define an axis 20 parallel to the axis 19.

A fork 21 (Figs. 2 and 3) is provided with trunnions 22 and 23 which rotate in the bearings 17 and 18. Accordingly the fork 21 is free to rotate inside the fork 16. The plane of the fork 21 is maintained parallel to the plane defined by the axis 1 of the telescope 24 and by axis 19 by means of a linkage comprising the crank pin 26 and connecting rod 25. The connecting rod 25 has a length equal to the separation of the axes 19 and 20, and its connection 27 to the fork 21 is separated from the axis 20 by the same distance as that between the crank pin 26 and the axis 19.

The arm 28 of fork 21 is disposed parallel to the axis 20 and is provided with a bearing 29 (Fig. 3) defining an axis 1′ lying in the plane of the fork 21. This axis 1′ is moreover parallel to the axis 1 of the telescope 24. A shaft 31 is mounted for rotation in the bearing 29 and has affixed at its upper end a fork 32. The shaft 31 is moreover fastened to the rotor of a motor 83 whose stator is pinned to fork 21. Fork 32 includes bearings 33 and 34 (Fig. 2) defining an axis 126 (Fig. 3) perpendicular to the axis 1′. The secondary star telescope 37 is mounted for rotation about the axis 126 by means of trunnions 35 and 36 (Fig. 2) which engage the bearings 33 and 34. The telescope 37 can be fixed in any desired position with respect to fork 32 such that its optical axis 2 (in the object space) which is always perpendicular to the axis 126, will make the axis 1′ an angle equal to the angular separation AB of the stars A and B (cf. Fig. 1). To this end a threaded ring 38 or similar means may be provided about one of the trunnions 35 and 36, adapted to be drawn into frictional engagement with the branch 30 of fork 32. Arm 30 of the fork 32 has affixed thereto a circular scale 39 with reference to which the angular position of the axis 2 may be read by means of a pointer 40 affixed to the trunnion 36. Accordingly as shaft 31 turns in bearing 29, the optical axis 2 of the secondary star telescope 37 traces out a cone about the axis 1′, i. e. a cone whose axis coincides with the line of sight to the primary star A.

The secondary star B lies on this cone, since the angle between the axes 1' and 2 is equal to the angular separation of the primary and secondary stars.

Figure 3:
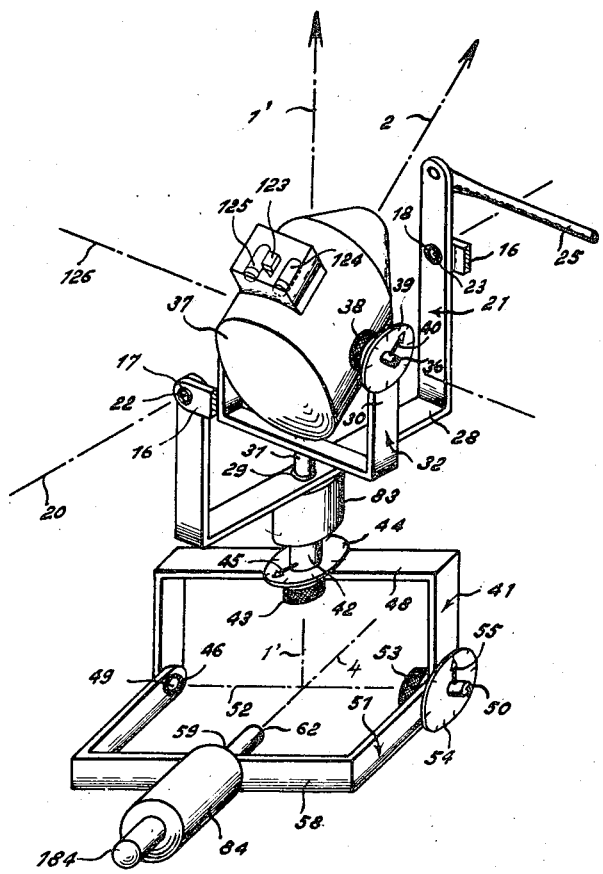
Fig. 3 is a partial perspective view of a portion of the instrument of Fig. 2 showing the elements of structure by which the data relating to the selected primary and secondary stars are put into the instrument in an initial adjustment, certain elements being again omitted for clarity.

The shaft 31 of the fork 32 is extended below the arm 28 of fork 21 by means of a shaft 42 to which a fork 41 is adjustably fixed (Fig. 3). The position of fork 41 on shaft 42 may be adjusted by means of a clamping ring 43 similar to the ring 38 previously described.

In the use of the instrument, the fork 41 is fixed with reference to the shaft 42 by means of clamping ring 43 in such a position that the plane perpendicular to the plane of fork 41 (as defined by the axis of shaft 42, coinciding with the axis 1', and by an axis 52 presently to be described) makes with the plane normal to the plane of the fork 32 (i. e. with the plane of axes 1' and 2 or 1 and 2) an angle BAP equal to the dihedral angle between the meridian plane of the selected primary star and the great circle joining the selected primary and secondary stars. It is to be noted that the plane normal to the plane of fork 32 contains the two telescope axes 1' and 2 (or 1 and 2). Of course in view of the distances involved between the observer's station and the surface of the celestial sphere the separation between the optical axis 1 of the primary star telescope and the axis 1' of shaft 31 is without significance. For establishment of the angle BAP a circular scale 44 is affixed to the arm 48 of fork 41 concentrically of the axis 1', and shaft 42 carries an index pointer 45. The relative position of the circular scale and pointer are so established as to give zero reading when the planes of the forks 32 and 41 coincide. Under these conditions it is clear from Fig. 1 that when the two telescopes are aligned with their stars, the polar axis of the celestial sphere will be contained in the plane perpendicular to the plane of fork 41.

The fork 41 includes two bearings 46 and 47 (Fig. 4) supporting trunnions 49 and 50 affixed to a fork 51. The bearings 46 and 47 define an axis 52 about which the fork 51 rotates. The axis 52 intersects the axis 1' about which the fork 21 rotates and is perpendicular thereto. For determination of position by means of selected primary and secondary stars the fork 51 is positioned about the axis 52 with respect to fork 41 so that the plane of fork 51 makes with that of fork 41 an angle equal to $$\frac{\pi}{2} - \delta_A$$

$\delta_A$ being the declination of the selected primary star. A clamping ring 53 is provided to permit adjustable fixation of the relative angular positions of the forks 41 and 51, and a pointer 55 affixed to the trunnion 50 of fork 51 indicates the relative position of the two forks with reference to a circular scale 54 fastened to fork 41. The angular reading of the pointer 55 is zero when the planes of the forks 41 and 51 coincide.

The arm 58 of fork 51 is disposed parallel to the axis 52 and includes a bearing 59 (Fig. 3) defining an axis 4 which intersects axis 52 perpendicularly. Bearing 59 supports a shaft 62 for rotation in the plane of the fork 51. With suitable adjustments at scales 44 and 54 as above described, the axis 4 of rotation of the shaft 62 is parallel to the polar axis when the primary and secondary star telescopes are aligned with their respective stars. The shaft 62 is continuous with the rotor of a motor 84 and with the rotor of an angular position transmitter 184 such as a self-synchronous generator, the stators of these two machines being fixed with respect to the arm 58 of fork 51. Forks 41 and 51 with bearing 59 thus define a plane, that of axes 1' and 4, which is parallel to the optical axis 1 of the primary star-following telescope.

The shaft 62 (Figs. 4 and 5) carries at its inner end another fork 61 provided with bearings 56 and 57 which support a vertical detector or level-seeking device generally indicated at 60. Bearings 56 and 57 define an axis 65 perpendicular to the axis 4 in the plane of axes 4 and 1'. This detector establishes the direction of the vertical 3 at the observer's station (see Fig. 1). It is supported in two trunnions 63 and 64 which rotate in the bearings 56 and 57 of fork 61, and when the device 60 assumes the level position, the axis 65 is horizontal. The trunnion 63 is affixed to the rotor of a motor 85 and to the rotor of an angular position transmitter 185, the stators of these two machines being fixed with respect to the fork 61. The direction 65 (Fig. 4) coincides with the East-West direction at the position of the instrument upon its proper alignment, since it lies in the horizontal plane and is perpendicular to the polar axis 4.

Figure 4:
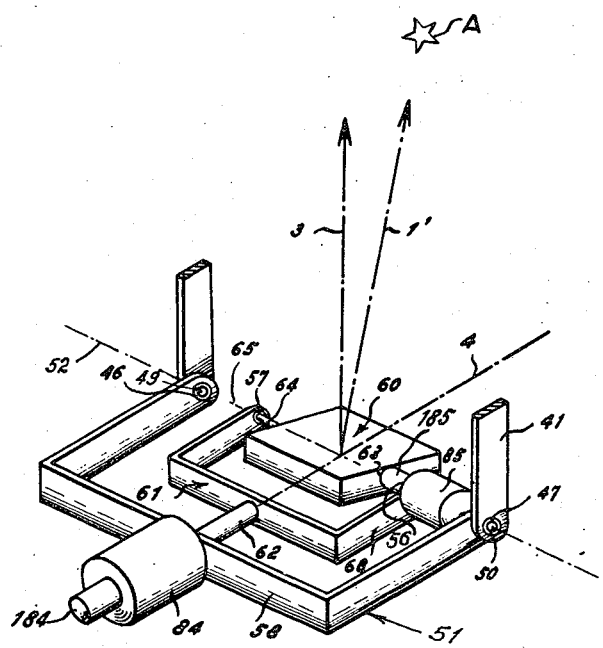
Fig. 4 is a perspective view of a portion of the apparatus shown in Fig. 3, showing in particular the vertical detector and associated elements by which the instantaneous values of the local hour angle of the primary star and the latitude of the instrument are measured.

It is apparent from Fig. 4 that the angular position transmitter 184 measures the local hour angle of the primary star, i. e. the dihedral angle between two planes both containing the polar axis 4 and the first of which, the observer's meridian, also contains the vertical direction 3 and the second of which, the primary star meridian, contains the line of sight 1' of the primary star. This is true because the axis 4 of motor 84 is perpendicular to both the East-West axis 65 and to the axis 52, which latter is perpendicular to the line of sight 1 or 1'. The axis 52 therefore lies in the plane of the celestial equator. Similarly the angular position transmitter 185 measures the angle between the polar axis 4 and the vertical direction 3, i. e. the complement of the latitude $\phi$.

For determination of the heading of the vehicle there may be affixed to the vertical detector 60 a motor 86 (Fig. 5) and a selsyn transmitter 186 whose common shaft 72 is so positioned with respect to that detector as to assume a vertical position when the detector is in operation, i. e. the axis of shaft 72 coincides with or is parallel to the direction 3. The shaft 72 carries a fork 71 provided with bearings 66 and 67 for the support of a collimator 73 by means of trunnions 69 and 70 which engage the bearings 66 and 67. Trunnion 70 is affixed coaxially with the rotors of motor 87 and selsyn transmitter 187, whose stators are affixed to fork 71.

The collimator 73 generates a bundle of rays parallel to its optical axis 74 (perpendicular to the axis of the trunnions 69 and 70). By a servo system including motors 86 and 87, presently to be described, the optical axis 74 is constrained to remain parallel to an axis fixed with respect to the vehicle. Accordingly the data furnished by transmitter 186 represents the heading of the vehicle, and the transmitter 187 provides the inclination of the vehicle with respect to the horizontal.

The servomotors 81 to 87 are two-phase motors. In all of these motors one of the stator windings, which may be termed the excitation winding, is continuously fed from a common source of alternating voltage. In all, the other winding, which may be termed the control winding, is fed with error signals derived from a servo system. The servo system is photoelectric in nature as to motors 81, 82, 83, 86 and 87, and of galvanic nature as to the motors 84 and 85 linked to the vertical detector.

In the drawings these motors have for the sake of simplicity been shown as directly linked to the elements whose position they control. It may of course be desirable in practice to provide suitable reduction gearing or other linkage between the motors and those elements. As to motors 84, 85, 86 and 87 which respectively drive shaft 62, trunnion 63, shaft 72 and trunnion 70, if reduction trains are employed, instead of transmitting the position of the driven elements by means of single selsyn transmitters 184, 185, 186 and 187, respectively, it may be preferable to use for each two selsyn transmitters, one for coarse indications and having its rotor fixed with respect to the shaft of its servomotors 84, 85, etc., and the other a fine position indicator whose rotor will be linked at unity drive ratio to the element driven by the reduction train, i. e. fork 61, detector 60, etc.

Lastly as to the slewing motors 81, 82 and 83, it is necessary to be able to point the telescopes 24 and 37 manually in the direction of the chosen stars. Accordingly, a friction or other disengageable drive must be provided between the rotors of these motors and the shafts which effect the corresponding motions of the telescopes. Suitable friction drives are well known, and Fig. 14 illustrates one associated with the motor 82.

The stator of motor 82 is affixed to the pedestal 75 by means of pediments 13 and 14. Its rotor is mounted on a hollow shaft 250 provided at its ends with shoulders 251 and 252. The hollow shaft 250 contains a solid shaft 12 terminated at its ends by means of parallel forks 9 and 16 (cf. Fig. 2). The shaft 12 includes additional shoulder plates 253 and 254, and a spring 255 is engaged between the plate 253 and shoulder 251 of shaft 250. The shoulders 252 and 254 are provided on their adjacent faces with friction pads 256. Under the influence of spring 255 the plates 252 and 254 are stressed into engagement with each other. If the spring 255 is compressed by shifting shaft 12 to the right (Fig. 14), the plates 252 and 254 will be disengaged, and it will be possible to rotate the shaft 12 by hand without rotating shaft 250. Similar friction drives are provided between shafts 6 and 31 and motors 81 and 83, respectively.

Figure 6:
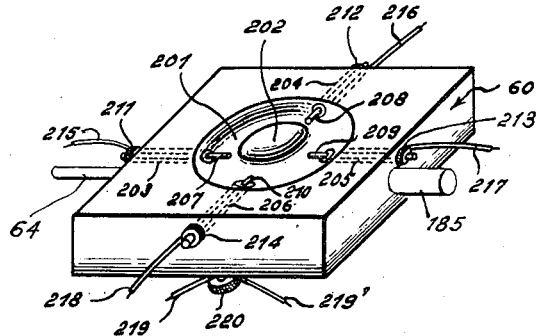
Fig. 6 is a perspective view of one form of device for determination of the vertical direction suitable for use in the instrument of the invention.
Figure 7:
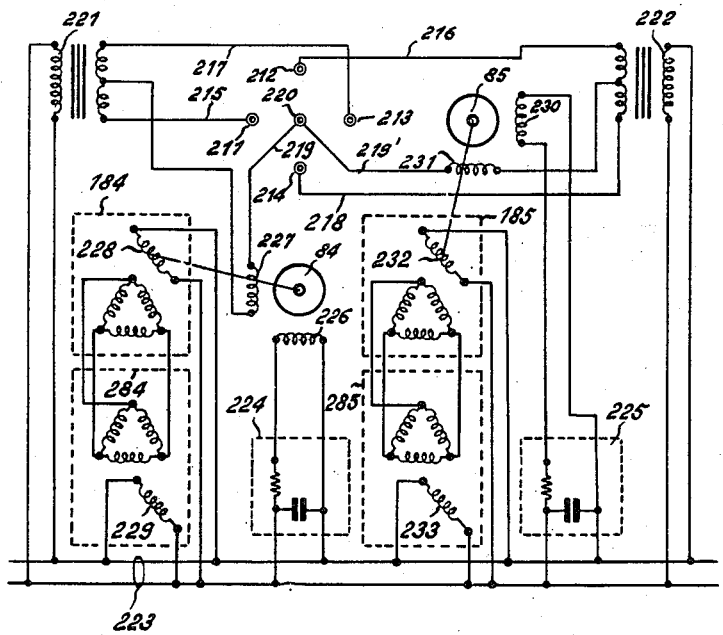
Fig. 7 is a schematic representation of the circuit of the vertical direction determining device of Fig. 6, of the servomechanism which adjusts this device with respect to the remainder of the instrument so that it will assume the vertical position, and of remote indicators of its position relative to the remainder of the instrument.

Fig. 6 illustrates the construction of one form of vertical detector suitable for use in the instrument of the invention, and Fig. 7 illustrates the associated servo systems and the elements provided for delivery to a chosen point in the vehicle of the local hour angle of the primary star and the latitude of the vehicle position.

Referring to Fig. 6, the vertical detector 60 includes a shallow bowl 201 of conducting material to which is connected an electrical terminal 220 connecting with conductors 219 and 219'. The bowl contains a drop of mercury 202.

Four insulating sleeves 203-206 pass through the surface of the bowl in two perpendicularly disposed pairs. Contact members 207-210 pass through the insulating sleeves to protrude beyond the inner surface of the conducting bowl, without contact therewith. The positions of the contacts 207-210 with respect to the surface of the bowl can be adjusted by means of ferrules 211-214 which at the same time serve as binding post terminals for the connection of conductors 215-218.

A suitable cover, not shown, is provided over the bowl to prevent loss of the mercury. When the bowl is horizontally positioned, the mercury 202 lies at the center of the bowl without contact with any of the contact members 207-210. On the other hand if the bowl is given an inclination with respect to the horizontal, the mercury will effect contact with one or with two of the members 207-210, and an electric circuit will be completed between the terminal 220 and one or more of the conductors 215-218.

The terminal 220 of the bowl and the lateral terminals 211-214 are shown in a rectangular array in the circuit diagram of Fig. 7.

In this circuit, the primary windings of two transformers 221 and 222 are fed from an A. C. line 223 available aboard the vehicle in which the instrument is mounted. This line similarly feeds exciting windings 226 and 230 of the two-phase motors 84 and 85 via 90 degree phase shifters 224 and 225. It also feeds the rotors 228 and 232 of the selsyn transmitters 184 and 185 and the rotors 229 and 233 of the selsyn receivers 284 and 285.

The secondary of transformer 221 is connected to terminals 211 and 213 via wires 215 and 217. The secondary of transformer 222 is connected to terminals 212 and 214 via wires 216 and 218.

The control winding 227 of motor 84 is connected between mid-point of the secondary of transformer 221 and the central or bowl terminal 220 of the detector. Similarly the control winding 231 of motor 85 is connected between the mid-point of the secondary of transformer 222 and the central terminal 220.

Referring again to Fig. 6 the vertical detector 60 is mounted in fork 61 with one pair 207 and 209 of the opposite mercury contacts aligned with the East-West suspension axis 65 of the detector. Accordingly the perpendicularly arranged contacts 208 and 210 lie in a plane normal to that of the fork 61 and containing the axis 4.

If the axis 65 departs from the horizontal, it will be restored thereto by the motor 84, and the selsyn receiver 284 in the indicator 244 of Fig. 13 will repeat the position of the selsyn transmitter 184 and consequently that of the motor 84. If the axis of contacts 208 and 210 departs from the horizontal, it will be restored thereto by the motor 85, and the selsyn receiver 285 in the indicator will repeat the position of the transmitter 185, and hence it will repeat the position of the motor 85.

Figs. 8 and 9 illustrate one form of construction suitable for the primary star telescope 24. This telescope is designed so as to provide with minimum bulk the maximum focal length and aperture possible, since the precision of angular indication varies directly with the focal length of the telescope and since the amount of light collected from a star varies directly with the aperture.

The optical arrangement presently to be described has the advantage of very low aberrations in the immediate vicinity of the axis while permitting the use exclusively of spherical or plane optical surfaces.

The telescope 24 (Fig. 9) includes a casing 101, an objective mirror 102 (Fig. 8) and a catadioptric magnifier 103 affixed to the casing by supporting arms 104. This magnifier includes a divergent lens 105 provided with a reflecting coating 106 on its convex face presented to the mirror 102.

A plane mirror 107 is positioned at the point of intersection of the two orthogonal axes of rotation 12 and 19 (Fig. 2) of the telescope. This mirror is inclined at 45 degrees to the optical axis 1 of the telescope. The plane mirror 107 is supported from the casing 101 by a stem 108. The mirror reflects the focus of the telescope to the point 110 on the axis 109 which is perpendicular both to the axis 1 of the telescope and to the axis of rotation 19. The casing 101 is apertured at 111 concentrically with axis 109.

The casing includes the trunnions 5 and 6 previously referred to, permitting rotation of the telescope in bearings 7 and 8 of the fork 9.

The casing 101 mounts an enclosure 112 containing a system for separation of the angular deviation of the telescope axis from the line of sight to the star which it is tracking into two orthogonally related components. These elements are shown in section and in plan respectively in Figs. 8 and 9. The separation system includes a block 122 of glass or similar reflecting material having a pyramidal shape of square base and whose apex 110 coincides with the focal point of the telescope as reflected by the mirror 107 along axis 109. The base of the pyramid is fastened to the face 113 of enclosure 112. The faces 114-117 of the pyramid (Fig. 9) are inclined at 45 degrees to the axis 109. The planes of the faces 114 and 116 are perpendicular to the plane defined by axes 1 and 109. Four photoelectric cells 118-121 such as tubes of the electron multiplier type are disposed about the faces of the pyramid as indicated in Fig. 9.

The cells 118 and 120 are associated with the pyramid faces 114 and 116, whereas the cells 119 and 121 are associated with faces 115 and 117. Thus the cells 118 and 120 control rotation of the telescope about the axis 19, whereas the cells 119 and 121 control its rotation about the axis of shaft 12.

When the optical axis of the telescope is directed exactly parallel to the line of sight to the primary star A, this star appears as a diffraction image equally distributed over the four faces of the pyramid about its apex 110. Consequently the four cells are equally excited and provide equal output currents. This result assumes that the two cells of each of the pairs 118 and 120 on the one hand and 119 and 121 on the other hand emit equal signals for equal illumination. The cells should be suitably matched for this purpose, and further compensation may be effected by adjustment of the excitation voltages applied to their accelerating electrodes.

If the optical axis of the telescope 101 departs from the line of sight to the primary star while remaining within the plane of Fig. 8, the light from the star will illuminate one of the faces 114 and 116 more strongly than the other. The servosystem presently to be described in connection with the Fig. 10 restores the optical axis of the telescope to the line of sight, and also corrects the orientation of the axis 1' about which the secondary star telescope rotates. If the optical axis of the telescope 101 deviates from the line of sight to the star A while remaining in the plane of Fig. 9, a similar unbalance of illumination as between the faces 115 and 117 will occur, and the servosystem of Fig. 10 will again restore the telescope axis to the line of sight to the primary star.

The secondary star telescope 37 shown in Fig. 3 is in its optical elements entirely similar to telescope 24. However for a given focal length its aperture need be only half as large, since the energy collected is employed to control a servosystem operating on a single degree of freedom instead of two as in the case of telescope 24. Accordingly the error signal separation system of the telescope 37 is correspondingly simplified.

This system is illustrated in Fig. 3. It comprises essentially a prism 123 whose edge is parallel to the optical axis 2 of the telescope 37 and whose faces are inclined at 45 degrees to the plane defined by the telescope axis and by the axis 126 of the trunnions 35 and 36, and two photoelectric cells 124 and 125 positioned opposite the prism faces. With the two telescopes initially pointed at their respective stars, the departures of the secondary star telescope 37 from alignment constitute motions of the optical axis of the secondary telescope over the surface of a cone containing the line of sight to the secondary star as an element. Two cells 124 and 125 therefore suffice to detect departures of the secondary star telescope from alignment.

Referring now to Fig. 10, which shows the servomotor system for maintaining the two telescopes in alignment with their respective stars, the alternating current line 223 feeds a rectifier 127. The rectifier provides a series of D. C. voltages such as 0, 150 and 300 volts for the operation of a D. C. amplifier, and a second series of voltages between zero and —1,000 volts for supply of the electron multiplier tubes.

The various accelerating electrodes of the electron multiplier tubes 118—121 and 124—125 are fed from the rectifier output by wires 128 and 130. It is to be understood of course that proper excitation of these electrodes requires more than two leads, but only two have been shown in the drawings for the sake of simplicity. The output signals of the primary star telescope cells 118 and 120 are applied to the input of a balanced D. C. amplifier 131 and the output signals of primary telescope cells 119 and 121 are applied to the input of D. C. amplifier 132, whereas the output signals of cells 124 and 125 of the secondary star telescope go to the input of D. C. amplifier 133.

The D. C. amplifiers 131, 132 and 133 are connected at their output with balanced magnetic amplifiers 134, 135 and 136, respectively. The outputs of these magnetic amplifiers are loaded with the primaries of transformers 137, 138 and 139, whose secondaries excite the control windings 141, 142 and 143 of the two-phase motors 81, 82 and 83. The excitation windings 140, 144 and 145 of these motors are fed from the A. C. line 223 via 90 degree dephasing circuits 146, 147 and 148.

The D. C. amplifiers may be of known type, and only the first of these, 131, is shown schematically in Fig. 10. It includes a first balanced stage comprising tubes 149 and 150 whose plates are fed from lead 129 of rectifier 127, held at 150 volts for example, and a second balance dstage comprising tubes 151 and 152 whose cathodes are fed from lead 129 and whose plates are fed from lead 257 at 300 volts, for example. The plate load of tube 151 consists of the control windings 159–162 of the magnetic amplifier 134, and the plate load of tube 152 comprises the control windings 163–166 of this magnetic amplifier.

The magnetic amplifiers may be of a known type and only one, 134, is schematically illustrated in Fig. 10. It includes two balanced stages 167 and 168 each comprising two transductors, 153 and 154 in the one case and 155 and 156 in the other. Each transductor includes an alternating winding, a self-excitation winding traversed by a D. C. current obtained from a bridge-type rectifier 157 or 158, and two control windings operating subtractively.

In operation, when the cells 118 and 120 of the primary star telescope, for example, receive from the star A unequal quantities of light, the error voltage applied to the input of the electronic amplifier 131 is amplified there and in the magnetic amplifier 134. A voltage appears at the terminals of the primary of transformer 137 and consequently at its secondary and at the winding 141 of motor 81. The motor accordingly causes the telescope 24 to rotate about the axis 19 until the two cells 118 and 120 again receive equal light stimulation. The operation of cell pairs 119, 121 and 124, 125 on motors 82 and 83 respectively is similar and need not be explained in detail.

Figs. 11 and 12 illustrate a system for maintaining the optical axis of the collimator 73 (Fig. 11) parallel to a fixed direction aboard the vehicle, for the generation of heading and inclination signals. If the instrument is mounted in an aircraft, the fixed direction may be selected as the longitudinal axis of the aircraft. A collimator 169 whose axis 192 is oriented parallel to the fixed reference direction in the vehicle is suitably mounted therein on a pedestal 248. It includes at one end a lens 170 and at the other end an angular component separation system similar to that contained in the casing 112 on primary star telescope 24, i. e. a rectangular pyramid 171 at the axial focus of lens 170 and four photoelectric cells 172–175. The output circuits of cells 172 and 174 are connected to the input of a direct current electronic amplifier 176 (Fig. 12) followed by a magnetic amplifier 177. The output of the amplifier 177 feeds the control winding 178 of motor 86. Similarly the output circuits of cells 173 and 175 are connected to the input of a D. C. electronic amplifier 182 followed by a magnetic amplifier 183 whose output feeds the control winding 188 of motor 87. The excitation windings of the motors 86 and 87 are respectively fed from the A. C. line 223 via 90 degree dephasing circuits 180 and 190. The rotors 179 and 189 of the self-synchronous transmitters 186 and 187, and the rotors 181 and 191 of the self-synchronous receivers 286 and 287 (in the indicator unit of Fig. 13) are also fed from the line 223.

In operation, when the optical axis 74 of the collimator 73 is parallel to the axis 192 of the collimator 169, the beam of parallel light generated by the collimator 73 converges at the apex of pyramid 171 and the four cells 172–175 are equally illuminated. The control windings 178 and 188 are therefore not excited, and the motors 86 and 87 are at rest. If the optical axis 74 of the collimator 73 takes on an inclination in the horizontal plane with respect to the axis 192 of the collimator 169, one of cells 172 or 174 will receive more illumination than the other. A current will pass through the winding 178; the motor 86 will restore axis 74 of collimator 73 to parallelism with axis 192; and the self-synchronous receiver 186 in the indicator 244 (Fig. 13) will repeat the indication of the heading angle of the vehicle given by the rotation of motor 86 and self-synchronous generator 186 required to keep axes 74 and 192 parallel, it being remembered that collimator 73 is supported from the horizontally stabilized detector 60, whose axis 65 is also maintained parallel to the east-west direction by alignment of the instrument. If the optical axis 74 becomes inclined with respect to the axis 192 in the vertical plane, one of the cells 173 or 175 will have greater illumination than the other. A current will pass through the winding 188, and the motor 87 will restore the axis 74 to parallelism with the axis 192. The self-synchronous receiver 287 in the indicator 244 will repeat the indication of the angle of the vehicle's inclination to the horizontal, given by the similarly required rotation of motor 87 and self-synchronous generator 187.

Fig. 13 illustrates an indicator suitable for presentation of the data furnished by the embodiment of the invention which has been described. In Fig. 13, a pointer 195 driven by the self-synchronous receiver 285 (cf. Fig. 6) indicates latitude $\phi$ with respect to a circular scale 193. Since the receiver 285 actually indicates the value $$\frac{\pi}{2} - \phi$$

the scale 193 is properly initially oriented to provide a direct reading of latitude.

The pointer 196, driven by the self-synchronous receiver 286 (cf. Fig. 12) indicates the vehicle's heading.

The pointer 197, driven by the receiver 287, indicates the inclination of the reference axis of the vehicle with respect to the horizontal.

The receiver 284 (cf. Fig. 7) drives shaft 199 and thence shaft 234 through a conical gear train 245. Shaft 234 connects with one of the inputs to a differential 235. A chronometer 246 giving Greenwich sidereal time $T_{SO}$ driving shaft 236 and thence shaft 237 via a conical gearing 247, provides a second input to the differential. The sum of these inputs is provided at the differential output 238 which drives the pointer 240 over a longitude scale 241. This scale is rotatably mounted in the indicator front panel and includes a circumferential ring 242 graduated in right ascension. The scale is to be rotated until its graduation in right ascension $AR_A$ with respect to an index 243 on the front panel of the indicator corresponds to the right ascension of the primary star A selected. Under these conditions the pointer 240 will give the longitude of the vehicle in accordance with equation 1.

The transformers, amplifiers and phase shifters of the servomechanism of Fig. 7 for stabilization of the vertical detector, the similar elements of Fig. 10 for follow-up motions of the star-tracking telescopes, and the similar elements of Fig. 12 for course and inclination indication (if provided), are stowed in some convenient place aboard the vehicle. Cablings have been omitted from the diagrammatic perspective views of Figs. 2, 3, 4, 5, 11 and 13.

The heading and inclination elements shown in Figs. 5 and 11 may of course be omitted from the instrument.

An alternative embodiment of the invention is shown in Figs. 15–21, including a different form of image-forming device and of optical detectors and error signal generators. In this embodiment a single image-forming device operative over a wide angular field is employed with two light detecting and error signal generating systems, with certain consequent simplification in the mounting and articulation of the two optical detectors. The image-forming device and one detector define a first optical axis and are mounted together in a housing provided with two principal degrees of rotational freedom with respect to a base. The error signal generating and servosystem associated with the first detector adjusts the housing by rotations about the two axes of these degrees of freedom to maintain this first optical axis parallel to the line of sight to the primary star. The second optical axis is defined by the same image-forming device and by a second optical detector which is adjustably fixable in the housing to incline the two optical axes to each other by the angular separation of the selected stars. The error signal generating and servosystem associated with the second detector adjusts the housing about the axis of a third rotational degree of freedom, which coincides with the first optical axis, to maintain the second optical axis parallel to the line of sight to the secondary star.

Means are provided, associated with or as part of the first detector and error signal generating system for preserving a prime direction or meridian about the first optical axis. The prime direction preserving means therefore has only two degrees of rotational freedom with respect to the vehicle in which the instrument is mounted and limits the primary star telescope of this embodiment, comprising the image-forming means and first detector, to the same two degrees of freedom. The third degree of rotational freedom of the housing is therefore in effect a degree of freedom of the second detector or secondary star telescope with respect to the first.

The error signal generating system associated with the second detector provides signals indicating the sign of the departure of the secondary star image from the plane defined by the two optical axes of this embodiment, and these signals are employed to restore the plane of the two optical axes to the plane defined by the lines of sight from the observer's station to the selected stars.

The mechanism for defining the polar axis of the instrument of this embodiment in a plane containing the first optical axis, for inclining this plane appropriately to the plane of the first and second optical axes, for inclining the polar axis to the first optical axis by the complement of the declination of the first star, and the vertical detector with its servosystem and data transmission devices are supported in the housing and are similar to the corresponding components of the first-described embodiment which are illustrated in Figs. 3, 4 and 5.

In the embodiment of Figs. 15–21 the common image-forming means and first optical detector may, by analogy with the embodiment of Fig. 2, be referred to as the primary star telescope while the common image-forming device and second optical detector may be referred to as the secondary star telescope.

Referring to Figs. 15, 16, and 17, 305 indicates the image-forming device which is used with both star-tracking telescopes. The image-forming device comprises a single wide angle objective lens, which may be of the form known as a "Topogon" as used in cartography. Such a lens is disclosed in German Patent No. 636,167, issued September 17, 1936, to the firm Carl Zeiss. The lens 305 is mounted in a housing generally indicated at 306. The housing includes a chamber 307 with a removable cylindrical extension 308. The chamber and its extension may be separated by means of a transverse partition 309 (Fig. 17). The housing is fixed in an external bearing member 310 of ring shape which is mounted for rotation at ball bearings 312 in a circular support or ring 313. The support 313 carries a motor 383 which drives a pinion 314 engaging a crown gear 315 concentrically fastened to the bearing member 310. The support 313 further has affixed thereto a crown gear 333 and two collinear trunnions 316 and 317 (Fig. 17). These trunnions are borne in bearings 318 (Fig. 15) at the ends of a fork 319 which plays the part of the ring in a gimbal mounting. The trunnion 316 is coupled to the rotor of a motor 381 mounted on the fork 319. The shaft 320 of fork 319 is coupled to a rotor of a motor 382 mounted on a base 375 which may be fixed in the vehicle in which the instrument is to be used or which is otherwise located at the observer's station. The motor 381 will hereinafter be referred to as the azimuth motor and the motor 382 as the elevation motor.

The portion 307 of the housing contains within its interior two combined light-sensitive detectors and error signal generating devices generally indicated at 321 and 322. These are mounted within the housing so that their axes 301 and 302, which are the optical axes of the instrument and the nature of which will be presently defined with reference to Figs. 18 and 19, pass through the nodal image point of the telescope objective 305. The devices 321 and 322 each generate, except when the instrument is perfectly aligned with the axes 301 and 302 parallel to the lines of sight to the selected stars, an A. C. error signal whose phase with respect to a second A. C. reference signal also generated by them indicates the error of positioning of the housing. These error signals are generated by periodically interrupting the light reaching the photosensitive elements in the detectors. The devices 321 and 322 may therefore be referred to as light modulators.

Modulator 321 is so mounted in the housing that its axis 301, which may be referred to as the axis of the primary star telescope comprising lens 305 and modulator 321, coincides with the common axis of the bearing member 310 and ring 313. At their ends 323 and 324 adjacent the objective 305 the modulators 321 and 322 are provided with short focus lenses 392 (Fig. 18) and the modulators are supported in the housing to position their lenses adjacent the focal surface of the objective, indicated at 326 in Fig. 15. This focal surface lies on a sphere fixed with reference to the housing 306 and having a radius $mf$ in which $f$ is the focal length of the objective and $m$ is the mean index of refraction of the glasses employed. The center of this sphere lies in the object space outside the objective.

The modulator 321 is fixed with respect to the housing except as to rotations of the latter about the axis 301. To this end it is mounted on a pedestal 327 (Fig. 17) which rotates at a bearing 368 affixed to the partition 309 of the housing. The pedestal 327 has affixed thereto a crown gear 328 with which there engages a pinion 329 whose shaft 330, borne in bearings 331 of the housing, carries at its other end a second pinion 332. The pinion 332 meshes with the crown gear 333 of the ring 313. The mesh of the pinion 329 with the gear 328 is so adjusted with reference to the mesh of the pinion 332 with the gear 333 as to be equal. Accordingly when the housing 306 turns with its bearing member 310 about axis 301 due to action of the motor 383, the pedestal 327 and modulator 321 remain stationary with respect to the ring 313. In this way a prime direction about axis 301 is preserved for the modulator 321.

The secondary light modulator 322 is mounted for arcuate motion in a plane containing the primary star telescope axis 301 while keeping its face 324 on the focal surface 326 of the objective. The modulator 322 is supported as indicated in Fig. 16 on a fork 334 which is pivoted at blocks 335 and 336 affixed to the walls of the housing 306. The blocks 335 and 336 are positioned so that the bearing axis 337 which they define passes through the nodal image point 325 of the objective and is parallel to the plane of the bearing member 310, i. e. perpendicular to axis 301. The fork 334 supports a hollow cylindrical casing 338 whose axis 302 intersects the axis 337 at the nodal point of the objective. The secondary modulator 322 is supported within the casing 338 and is allowed to move axially of that casing without rotation by means of a lug 339 engaging an axial opening 340 in the casing 338. A spring 341 is strung between the lug 339 of the modulator proper and an anchor pin 342 attached to the casing 338. At its lower extremity the modulator body carries a skid 343 which is stressed by the spring 341 against a rail 344 affixed to the inner side of the chamber 307. The rail 344 is dimensioned to maintain the upper face 324 of the modulator 322 on or adjacent the focal surface of the objective 305.

One limb of the fork 334 has affixed thereto a toothed sector 345 which is engaged by a tangent screw 346. The shaft 347 of screw 346 is supported in appropriate bearings 348 and 349 fixed in the housing 306. By rotating the tangent screw by means of a knob 350 the axis 302 of the secondary modulator may be inclined to the primary star telescope axis angle by the angle AB, which can be read off from a scale 351 at a pointer 352 affixed to the tangent screw.

To the lower side of the partition 309 there is affixed a shaft 353 coaxial with the axis 301. The shaft 353 corresponds to the shaft 42 of Fig. 3 and supports the system of articulated forks, level-seeking device, servomotors and data position transmitters described in conjunction with Figs. 3, 4, 5, 6 and 7.

In the embodiment of Figs. 15 and 16, the fork 354 is adjustably fixable with respect to shaft 353 by means of a clamping ring 355 to establish the plane perpendicular to the plane of the fork 354 at an inclination to the plane of the axes 301 and 302 equal to the angle between the meridian of the primary star and the great circle passing through the primary and secondary stars. The fork 364 is likewise set in an initial adjustment so that its plane, which contains the axis of the motor 384 (the polar axis of the instrument) is inclined to the axis 301 by the complement of the declination of the selected primary star. As in the case of the embodiment of Figs. 3–7, upon alignment of the axes 301 and 302 with the lines of sight to the selected stars and upon corrected alignment of the vertical detector, the motor 384 measures the hour angle of the primary star and a motor 385 (the analogue of motor 85 of Fig. 4) measures the angle between the polar axis and the vertical at the observer's station, i. e. the complement of the latitude $\phi$.

The construction of the primary star telescope light modulator 321 is illustrated in Figs. 18 and 19. The secondary light modulator 322 is identical with modulator 321 except that it is supported against rotation about its own axis within the housing in a cylindrical casing 338 instead of from a rotating base 327.

In Fig. 18 the reference character 388 indicates generally an electric motor having a stator 387 and a rotor 388'. The shaft 389 of the rotor is hollow, and is supported at ball bearings 390 in the stator. The motor is supported from the pedestal 327 to which it is affixed by anchor members 379 and 380 preferably with its axis of rotation intersecting the nodal image point of the objective 305.

The motor shaft 389 supports at its other end a cup 391 whose axis is coaxial with the axis 301 of the motor. This cup is closed at its front end by means of a lens 392 which forms in the plane 393 an image of the image of the star A formed by the objective 305. On its outer surface the lens 392 is made opaque over a semicircular area indicated in Fig. 19, where the reference character 395 indicates the opaque area separated from a transparent area 396 by the diameter 394, which intersects the motor axis 301.

A hollow shaft 397 is supported within the motor shaft 389, the shaft 397 being fixedly supported in the pedestal 327. At its front end the shaft 397 supports a shallow cup 399 containing a photocell 400 whose sensitive surface is in the plane 393. The leads 401 to the cell 400 are brought out through the hollow shaft 397 to error signal voltage terminals 402.

A rotating magnet 403 is affixed to the motor shaft 389 and rotated by the motor along with the cup 391 and lens 392. The magnet 403 turns between the poles of an armature 404 (fixed to the stator) which carries a winding 405 (Fig. 19) brought out to reference voltage terminals 406. The axis of the poles of the magnet 403 lies in the meridian plane of the motor shaft defined by the diameter 394 which separates the transparent and opaque sectors of the lens 392.

In view of the structure described in connection with Fig. 17 the pedestal 327 and the axis 407 of the poles of armature 404 maintain a fixed direction with respect to the axis 470 of the trunnions 316 and 317, and the phase of the reference voltage generated in the winding 405 is unaffected by rotation of the housing about the axis 301. The axis 407 is made parallel to the axis 470.

Referring now to Fig. 20, there is shown diagrammatically the servo system employed to adjust the housing in its two principal degrees of freedom with respect to the base 375 as required to maintain the axis 301 parallel to the line of sight from the instrument to the primary star. In Fig. 20, the voltage appearing at the reference signal terminals 406 of the primary light modulator 321 is applied in parallel to amplifiers 412 and 413. The output of the amplifier 412 is applied to one field winding 408 of the two-phase motor 381 (cf. Fig. 15). The output of the amplifier 413 is applied to one field winding 410 of the two-phase motor 382 via a phase shifting network 414 giving a 90° phase change. The second field windings 409 and 411 of motors 381 and 382 are energized with the error signal voltage appearing at modulator terminals 402 after amplification in an amplifier 415. A low pass filter 416 is inserted between the amplifier 415 and the windings 409 and 411 to cut off harmonics of the rotational frequency of the motor 388. Fig. 21 is a similar diagrammatic representation of the servo system employed to adjust the housing about the axis 301 to maintain the axis 302 in alignment with the line of sight to the secondary star.

In Fig. 21 406' and 402' represent respectively the reference and error signal terminals of the secondary light modulator 322, corresponding to the terminals 402 and 406 of the modulator 321. One field winding 418 of motor 383 is fed with the voltage from reference signal terminals 406' after amplification in the amplifier 417. The second field winding 419 of the same motor is fed with the error signal voltage available at terminals 402' after amplifying and filtering in circuits 420 and 421 comparable to the amplifier 415 and filter 416 of Fig. 20. The amplifiers, filters and phase shifters of Figs. 20 and 21 may be located at any convenient position adjacent the instrument, with electrical connections to the interior of the housing by means of cables or slip rings.

The operation of the light modulators and servo systems of Figs. 18–21 may be understood by reference to Fig. 22. In Fig. 22, considering first the operation of motors 381 and 382 let the curve 422 represent the wave form of the voltage obtainable at the output of the amplifier 412. This voltage passes through zero at the instant when the axis of the poles of the rotating magnet 403 (parallel to the dividing line 394 on lens 392) coincides with the axis 407 of the pole pieces of armature 404. Let further curve 423 represent the wave form of the voltage obtained at the output of the phase shifting network 414. The voltage 423 is 90° displaced from the voltage 422. The curve 424 represents the wave form of the error signal voltage obtained at the output of the amplifier 415, and curve 425 represents the wave form of the fundamental component of the voltage 424 as obtained at the output of the filter 416. The voltage 425 passes through zero value (i. e. falls to zero or departs from zero) when the diametral boundary 394 between the opaque and the transparent zones of the lens 392 passes through the image of the star A formed by the objective 305 and lens 392 and which is represented at 426 in Fig. 19.

If the image 426 lies on the axis 407 of the poles of armature 404 otherwise than at the center of the cell, there will be an error angle in elevation. It is to be remembered that the axis 407 is maintained parallel to the axis 470 of trunnions 316 and 317. The voltages 422 and 425 will be in phase, and the azimuth scanning motor 381 receiving these in-phase voltages will remain at rest, whereas the elevation motor 382 receiving at its windings 410 and 411 two voltages in quadrature will rotate until the image 426 lies at the center of the cell. If the image 426 lies on the axis 427 perpendicular to the axis 407 (Fig. 19), there is an error in azimuth instead. The voltage curves 423 and 425 will be in phase, and the elevation motor 382 will be at rest whereas the azimuth motor 381 will receive voltages in quadrature and will rotate until the image 426 lies at the center of the cell. For all other positions of the image 426 both motors 381 and 382 will rotate simultaneously until the image is formed at the center of the cell, i. e. at the intersection of the line of separation 394 with the axis 301. Fig. 22 is drawn for such an intermediate position of the image since the voltage 425 is not in phase with either of the voltages 422 and 423.

It is apparent from the foregoing discussion that the position of no error signal for the image of the primary star is the mid point of the dividing line 394 and that this line should intersect the axis of rotation of the motor 388. The primary star telescope axis 301 which the instrument seeks to make and maintain parallel with the line of sight to the selected primary star is therefore defined by the line between the nodal image point of the objective and this zero error signal point on the dividing line 394 in the primary star telescope modulator. This primary star axis 301 is also preferably coaxial with the axis of rotation of the motor 388 as indicated in Fig. 18. The secondary star telescope axis is similarly defined by the line from the corresponding no error signal image point in the secondary star telescope modulator to the nodal image point of the objective, and it is likewise preferable that the motor of the secondary star telescope modulator be coaxial to the secondary star telescope axis.

The secondary star telescope modulator 322 which may be identical in construction with that shown in Figs. 18 and 19 controls only a single motor 383. The axis 407' of the poles of the reference voltage generator armature 405 of this modulator corresponding to the axis 407 of Fig. 19 is positioned to lie in the plane containing the axes 301 and 302 of the two modulators as indicated in Fig. 16. Accordingly, the error signal voltage of the modulator 322 due to departure of the image of the secondary star from the plane of the axes 301 and 302 is 90° out of phase with the reference signal voltage from the winding 405 of the secondary star modulator. These voltages, applied respectively to terminals 402' and 406' of Fig. 21 result in energization of the motor 383. Upon a shift of the secondary star image from one to the opposite side of the plane of axes 301 and 302, the phase of the error voltage of the modulator 322 is reversed, and the direction of rotation of the motor 383 is reversed also.

The motors 384 and 385 are controlled in their operation by the vertical detector exactly as in the case of the embodiment described in Figs. 1–14.

A further modified embodiment of the navigation instrument of the invention is illustrated in Fig. 23. In the embodiment of Fig. 23 the image-forming device comprises a concave spherical mirror 544 with a spherical corrector plate 545. The mirror and corrector plate are supported rigidly together by means not shown with their centers of curvature concentrically positioned at O, the radius of curvature of the corrector plate being half the radius of curvature of the mirror. The mirror and corrector plate are supported in the vehicle with their common axis of symmetry 546 approximately vertical.

Parallel rays 547 assumed to come from the primary star A are brought to focus at the point 548 on the internal surface of the corrector plate 545 where they form an image of the star A, the radius from O to 548 being parallel to the line of sight from the instrument to star A. Similarly the image of the secondary star B is formed at a point 549 on the same spherical surface, oriented with respect to O parallel to the line of sight to star B.

Two light modulators 521 and 522 similar respectively to the modulators 321 and 322 of the embodiment of Figs. 15–22 are movably mounted with respect to the image-forming device but with their axes constrained to pass through the center of curvature O.

The first modulator 521 is mounted to possess two rotational degrees of freedom with respect to the mirror 544. A rigid bar 551 supports the modulator 521 at an offset portion 550 of a shaft 553 of a gimbal suspension. The shaft 553 is coupled to a motor 582 whose stator is affixed to the gimbal ring 554. The ring is provided with trunnions 555 and 556, the first of which is coupled to the motor 581, fixedly supported in the vehicle. A fixed bearing 557 supports the trunnion 556. The axes of motors 581 and 582 intersect at the point O so that their rotations will sweep the modulator 521 over a spherical surface concentric with and adjacent the inner surface of the corrector plate 545.

The secondary light modulator 522 possesses a single degree of freedom with respect to the primary light modulator 521. A motor 583 is supported with its stator affixed to the offset portion 550 of the shaft 553. The shaft 558 of motor 583 is hollow and accommodates the bar 551. The shaft 558 has fastened thereto a transverse pin 559 which supports pivotally a fork 560 the angular position of which can be fixed with respect to the pin by means of a clamping nut 561. A bar 552 affixed to the fork 560 supports the secondary light modulator 522. The clamping nut 561 corresponding to the nut 38 of Fig. 3 makes possible a fixation of the secondary light modulator with its axis inclined to that of the primary by the angle AB of the angular separation of the primary and secondary stars to be employed.

The members 551 and 552 are dimensioned to position the active surfaces 523 and 524 of the light modulators close to the inner surface of the corrector plate 545.

An extension of the shaft 553 has affixed at right angles thereto a cylindrical bearing 562 in which there rotates a shaft 563. Shaft 563 carries a sprocket wheel 566 engaging with a loop of perforated metallic ribbon 569. The loop 569 is similarly engaged by a sprocket wheel 567 which is affixed to shaft 558 of motor 583.

The shaft 563 corresponds to the shaft 42 of Fig. 3 and fork 564 corresponds to fork 41 of that figure. In the putting of the input data into the embodiment of Fig. 23, fork 564 is so positioned, by means of clamping ring 565 which corresponds to clamping ring 43 of Fig. 3, that the plane normal to its plane makes with the plane containing the axes 501 and 502 the dihedral angle BAP of Fig. 1.

Fork 564 supports the other elements of the vertical detector mechanism illustrated in Figs. 4 and 5, 6 and 7. The embodiment of Fig. 23 also includes servo systems of the type illustrated in Figs. 20–22 connected with the apparatus of Fig. 23 by cables or slip rings. The embodiment of Fig. 23 like that of Figs. 15–22 is to be employed in conjunction with an indicator of the type shown in Fig. 13.

The error signal generating and servo systems of the embodiment of Figs. 1–14 may be substituted in the embodiments of Figs. 15–23 for the light modulators and associated apparatus of Figs. 17–23.

While the invention has been described hereinabove in terms of a number of preferred embodiments, the invention itself comprises numerous modifications and variations thereof, all falling within the scope of the invention as set forth in the appended claims.

The means, sometimes referred to herein as "telescopes," for tracking the stars and for defining the optical axes of the instrument which are maintained in coincidence with the lines of sight to those stars in the course of the tracking process and the means by which the plane of those two optical axes is materialized may for example take various forms. Indeed as used herein the term "telescope" does not connote an instrument for the formation at infinity of an image of an infinitely distant object. Rather it is an instrument for forming within the limits of diffraction point images of distant objects. Obviously numerous optical elements or combinations thereof may be employed for this purpose.

All that is required optically is an element or elements capable of forming separate point images of separate chosen celestial bodies, and separate means defining in conjunction with those elements preferred positions for those point images, and capable of developing error signals upon departure of those point images from the preferred positions. The optical axes of the instrument are then found by tracing back from those preferred positions through their associated image-forming elements into the object space.

Various forms of servomechanism may be employed to adjust the position of the optical axis-defining devices with respect to each other and to the remainder of the instrument and its base in order to maintain alignment of the optical axes of the instrument with the lines of sight from the instrument to the chosen celestial bodies.

Moreover various mechanisms may be employed to define the axis (polar axis of the instrument) lying in a plane containing or parallel to one of the optical axes of the instrument, this polar axis being one of the axes of suspension of the vertical detector and assuming upon alignment of the instrument a position parallel to the polar axis of the celestial sphere. In the embodiments described, forks have been utilized for support of the polar axis-defining means and for support of the vertical detector for rotation about the East-West axis. It is clear however that other mechanisms than forks may be employed. For the sake of simplicity the means for inserting input data to the instrument in the form of the angle AB between the lines of sight to the selected stars, the dihedral angle BAP between the meridian of the primary star and the great circle joining the two and the declination $\delta_A$ of the primary star have been shown as clamping rings 38, 43 and 53 and fix appropriate elements of the instrument in desired angular relations to each other. These clamping rings may however be replaced by angular position data receivers such as self-synchronous motors remotely controlled from an appropriate position such as that of the indicator of Fig. 13.

The embodiment described has included a particular form of vertical detector or level-seeking device, including separate servomechanisms for its stabilization about two axes. Other forms of vertical detector may of course be used instead. These may operate without the servomechanisms shown in the drawings. Angular position data transmitters for the detector are however desirable, so that the data of latitude and local hour angle of the primary star may be conveniently available at another location for presentation, as for example by means of an indicator of the general type shown in Fig. 13.

We claim:

1. An instrument for celestial navigation comprising a base, image-forming means, separate first and second means associated with said image-forming means defining respectively first and second optical axes, means to position said separate means to each other to incline said optical axes at a desired angle equal to the angular separation of two celestial bodies, said first optical axis-defining means having two rotational degrees of freedom with respect to said base, said second optical axis-defining means having a single rotational degree of freedom with respect to said first optical axis-defining means, first and second photoelectric tracking devices respectively associated with said first and second optical axis-defining means and generating error signals upon small departures of said first and second optical axis-defining means respectively from the images of said celestial bodies formed by said image-forming means, a first servomechanism responsive to signals from said first device to restore said first optical axis-defining means to the position of the image of a first one of said bodies formed by said image-forming means, a second servomechanism responsive to signals from said second device to restore said second optical axis-defining means to the position of the image of the other of said bodies formed by said image-forming means, means defining a polar axis in a first plane parallel to said first optical axis, said polar axis-defining means being adjustably fixable with respect to said second optical axis-defining means to position said first plane at an inclination to the plane defined by said optical axes equal to the angle between the great circle joining said bodies and the celestial meridian of said first body, said polar axis-defining means being further adjustably fixable with respect to said first optical axis-defining means to position said polar axis within said first plane at an inclination to said first optical axis equal to the complement of the declination of said first body, a vertical detector supported from said polar axis-defining means for rotation about said polar axis and about an axis perpendicular thereto, whereby upon alignment of said first and second optical axis-defining means with said images, said polar axis will be parallel to the polar axis of the celestial sphere and upon alignment of said vertical detector with the vertical direction the angle between said polar axis and the direction of the vertical will equal the complement of the latitude at the position of the instrument, and the dihedral angle between the plane defined by said polar axis and the vertical direction and the plane defined by said polar axis and said first optical axis will equal the instantaneous local hour angle of said first body.

2. An instrument for celestial navigation comprising separate first and second means defining respectively first and second lines of sight, means to position said first line of sight-defining means with said first line of sight directed at a first selected celestial body, means to rotate said second line of sight-defining means about a pivot axis perpendicular to said first line of sight through an angle equal to the angular separation between the first celestial body and a second selected celestial body, means to rotate said second line of sight-defining means about an axis parallel to said first line of sight to direct said second line of sight at said second celestial body, means defining a polar axis in a first plane parallel to the first of said lines of sight, said axis-defining means being adjustably fixable with respect to said line of sight-defining means to position said first plane at an inclination to the plane defined by said lines of sight equal to the angle between the great circle joining said bodies and the celestial meridian of one of said bodies, said axis-defining means being further adjustably fixable with respect to said line of sight-defining means to position said polar axis within said first plane at an inclination to the line of sight defined by said first line of sight-defining means equal to the complement of the declination of said one celestial body, and a vertical detector supported from said axis-defining means for rotation about said polar axis and about an axis perpendicular thereto, whereby upon alignment of the lines of sight defined by said first and second line of sight-defining means with the lines of sight to said first and second bodies respectively said polar axis will be parallel to the polar axis of the celestial sphere and upon alignment of said vertical detector with the vertical direction, the angle between said polar axis and the direction of the vertical will equal the complement of the latitude at the position of the instrument, and the dihedral angle between the plane defined by said polar axis and the vertical direction and the plane defined by said polar axis and the line of sight to said one celestial body will equal the instantaneous local hour angle of said one body.

3. An instrument for celestial navigation comprising two telescopes mounted for rotation together about two separate axes, the second of said telescopes being adjustably fixable with respect to the first with its optical axis at an inclination to an axis parallel to the optical axis of the first equal to the angular separation of two selected celestial bodies, said second telescope being rotatable about said axis parallel to the optical axis of the first telescope, photoelectric tracking means associated with said first telescope to maintain said first telescope with its optical axis parallel to the line of sight to one of said bodies, photoelectric tracking means associated with said second telescope to maintain said second telescope with its optical axis parallel to the line of sight to the other of said bodies, means defining an axis in a first plane parallel to the optical axis of the first telescope, said means being adjustably fixable with respect to the second telescope to position said first plane at an angle to the plane defined by the optical axes of said telescopes equal to the angle between the great circle joining said bodies and the celestial meridian of the first of said bodies, said means being further adjustable to position said axis in said first plane at an inclination to the optical axis of said first telescope equal to the complement of the declination of said first body, and a vertical detector supported from said axis-defining means for rotation about said axis in said first plane and about an axis perpendicular thereto.

4. An instrument for celestial navigation comprising a base, two telescopes mounted together with two rotational degrees of freedom with respect to said base, first and second motors coupled to said telescopes for rotation thereof in said two degrees of freedom respectively, the second of said telescopes being mounted with its optical axis at an adjustably fixable inclination to an axis parallel to the optical axis of the first telescope, said second telescope being mounted with a single degree of freedom with respect to the first telescope by rotation about an axis parallel to the optical axis of the first telescope, a third motor coupled to said second telescope for rotation thereof about said axis parallel to the optical axis of the first telescope, a photoelectric tracking device associated with said first telescope, a servomechanism energized by error signals derived from said tracking device upon deviation of the optical axis of said first telescope from parallelism with the line of sight to a first chosen celestial body, a second photoelectric tracking device associated with said second telescope, a second servomechanism energized by error signals derived from said second tracking device upon deviation of the optical axis of said second telescope from alignment with a second chosen celestial body to restore said second telescope to alignment with said second body, means defining a polar axis in a first plane parallel to the optical axis of the first telescope, said means being adjustably fixable with respect to the second telescope to position said first plane at an angle to the plane defined by the optical axes of said telescopes equal to the angle between the great circle joining said bodies and the celestial meridian of the first of said bodies, said means being further adjustable to position said polar axis at an inclination to the optical axis of said first telescope equal to the complement of the declination of said first body, and a vertical detector supported from said axis-defining means for rotation about said polar axis and about an axis perpendicular thereto.

5. An instrument for celestial navigation comprising two telescopes linked together for rotation about two separate axes of rotation, the second of said telescopes being adjustably fixable with respect to said first telescope to position its optical axis at a desired inclination to the optical axis of the first telescope, first and second motors coupled to said telescopes for rotation thereof together about said axes of rotation respectively, a third motor coupled to said second telescope for rotation thereof about an axis parallel to the optical axis of the first telescope without changing the inclination of its optical axis to the optical axis of the first telescope, means defining a polar axis in a first plane parallel to the optical axis of the first telescope, said means being adjustably fixable with respect to said second telescope to position said first plane at a desired dihedral angle to a second plane defined by the optical axis of the second telescope and the axis about which it is rotated by said third motor, said means being further adjustably fixable with respect to said second telescope to position said polar axis at a desired inclination to the optical axis of said first telescope, a vertical detector supported for rotation about said polar axis, said detector being further supported for rotation about an axis perpendicular to said polar axis, first and second tracking devices associated with said first telescope to generate separate error signals referable to the two common axes of rotation of the two telescopes upon departures of the optical axis of said first telescope from the line of sight from the instrument to a selected primary star, first and second servo systems between said first and second tracking devices and said first and second motors, a third photoelectric tracking device associated with said second telescope to generate an error signal upon departures of the optical axis of said second telescope from alignment with the line of sight from the instrument to a selected secondary star, a third servo system energizing said third motor from the error signals of said third tracking device, angular position indicators coupled to said vertical detector for repetition of the inclination thereof about its two penpendicular axes of support, a clock indicating Greenwich sidereal time, and differential means receiving as inputs sidereal time and the inclination of said vertical detector about its first axis of rotation.

6. An instrument for celestial navigation comprising first and second star-tracking telescopes, means to rotate said first telescope about two mutually perpendicular axes, means to rotate said second telescope about a pivot axis perpendicular to the optical axis of the first telescope to position the optical axis of the second telescope at an adjustably fixable inclination to the optical axis of the first telescope equal to the angular separation of two stars to be tracked with the two telescopes, means to rotate said second telescope about an axis parallel to the optical axis of the first telescope, first means defining a first plane parallel to the optical axis of the first telescope, said first means being adjustably fixable with respect to the second telescope to position said first plane at an inclination to the plane of the two telescope axes equal to the angular separation of the great circle joining said two stars from the meridian plane of one of said stars, second means defining a polar axis in said first plane, said second means being adjustably fixable with respect to said first means to position said polar axis with respect to the optical axis of the first telescope at an angle equal to the complement of the declination of said one star, whereby upon alignment of said first and second telescopes with said one star and with the other of said stars respectively, said polar axis will be parallel to the polar axis of the celestial sphere, a vertical detector supported from said second means and rotatable about said polar axis, said detector being further rotatable about an axis perpendicular to said polar axis, whereby upon said alignment the vertical direction defined by said detector makes with said polar axis an angle equal to the complement of the latitude at the position of the instrument, the second axis of rotation of the vertical detector assumes a direction parallel to the East-West direction at the position of the instrument, and the angle between the plane defined by the polar axis and the vertical direction and the plane defined by the polar axis and the optical axis of the first telescope is equal to the instantaneous local hour angle of the primary star.

7. An instrument for celestial navigation comprising two telescopes linked together for rotation about two separate axes, the second telescope being adjustably fixable with respect to the first to position its optical axis at a desired inclination to the optical axis of the first, first and second motors coupled to said telescopes for rotation thereof together about said axes of rotation respectively, a third motor coupled to the second telescope for rotation thereof about an axis parallel to the optical axis of the first telescope without changing the inclination of its optical axis to the optical axis of the first telescope, means defining an axis in a first plane parallel to the optical axis of the first telescope, said means being adjustably fixable with respect to said second telescope to position said first plane at a desired dihedral angle to a second plane defined by the optical axis of the second telescope and the axis about which the second telescope is rotated by the third motor, said means being further adjustably fixable with respect to the second telescope to position said axis in said first plane at a desired inclination to the optical axis of said first telescope, a vertical detector supported for rotation about said axis in said first plane, the detector being further mounted for rotation about an axis perpendicular to said axis in said first plane, a photoelectric tracking device associated with said first telescope to generate error signals referable to the common axes of rotation of the two telescopes upon departures of the optical axis of said first telescope about said common axes of rotation from the line of sight from the instrument to a selected primary celestial body, first and second servo systems energized by said error signals, said servo systems including said first and second motors respectively, a photoelectric tracking device associated with said second telescope to generate error signals upon departures of the optical axis of said second telescope from alignment with the line of sight from the instrument to a selected secondary celestial body, a third servo system including said third motor, said third system being energized from the error signals of said second tracking device, angular position indicators coupled to said vertical detector for repetition of the inclination thereof about its two axes of support, a clock indicating Greenwich sidereal time, and differential means receiving as inputs sidereal time and the inclination of said vertical detector about said axis in said first plane.

8. An instrument for celestial navigation comprising two telescopes mounted together for rotation about two mutually perpendicular axes, separate motors effecting rotation of the telescopes together about said two axes respectively, the second of said telescopes being movably supported with respect to the first with its optical axis in adjustably fixable position with respect to the optical axis of the first, a third motor effecting rotation of the second telescope about the optical axis of the first with its optical axis in fixed inclination to that of the first, means defining an axis in a first plane parallel to the optical axis of the first telescope, said means being adjustably fixable with respect to the second telescope to position said first plane at an inclination to the plane defined by the two telescope optical axes equal to the angular separation of the great circle joining two celestial bodies to be followed by the telescopes from the plane of the celestial meridian of the body to be followed by the first of the said telescopes, said means being further adjustable with respect to the second telescope to position said axis in said first plane at an inclination to the optical axis of the first telescope equal to the complement of the declination of said first body, level-seeking means supported for independent rotations about said axis in said first plane and about an axis perpendicular thereto, whereby upon alignment of the optical axes of the telescopes with their respective bodies, said axis in said first plane will be parallel to the polar axis of the celestial sphere and upon assumption by the level-seeking device of a horizontal position, the angle between said axis in said first plane and the direction of the vertical determined by the level-seeking device will equal the complement of the latitude at the position of the instrument and the dihedral angle between the plane defined by said axis in said first plane and the vertical direction and the plane defined by said axis in said first plane and the optical axis of the first telescope will be equal to the local hour angle of the first body.

9. An instrument for celestial navigation comprising a base, a first shaft journaled in said base, a first motor coupled between said base and said first shaft, a first telescope supported from said first shaft for rotation about an axis perpendicular to said first shaft, said telescope having its optical axis perpendicular to its said axis of rotation, a second motor coupled between said first shaft and said first telescope, a first support journaled from said first shaft for rotation about an axis parallel to the axis of rotation of said first telescope, a second support journaled from said first support for rotation about an axis perpendicular to the axis of rotation of said first support, means linking said first support and first telescope to maintain the axis of rotation of said second support parallel to the optical axis of said first telescope, a second telescope supported from said second support for rotation about an axis perpendicular to the axis of rotation of said second support, said second telescope being adjustably fixable with respect to said second support to position its optical axis at an inclination to the axis of rotation of said second support equal to the angular separation of two chosen celestial bodies, a third motor coupled between said first and second supports for rotation of said second support with respect to said first support, a first photoelectric tracking device associated with said first telescope to develop error signals upon departures of the image of a first one of said bodies from the optical axis of said first telescope, a servomechanism including said first and second motors energized by said error signals, a second photoelectric tracking device associated with said second telescope to develop error signals upon departures of the image of the second of said bodies from the optical axis of said second telescope, a servomechanism including said third motor energized by the error signals of said second tracking device, a third support supported from said second support, a fourth support supported from said third support for rotation about an axis perpendicular to the axis of rotation of said second support, a fifth support supported from said fourth support for rotation about an axis perpendicular to the axis of rotation of said fourth support, said third support being adjustably fixable with respect to said second support to incline the plane defined by the axis of rotation of said fifth support and the axis of rotation of said second support to the plane defined by the axis of rotation of said second support and the optical axis of said second telescope by an angle equal to the angle between the great circle of the celestial sphere joining said bodies and the celestial meridian of said first body, a vertical detector supported from said fifth support for rotation about an axis perpendicular to the axis of rotation of said fifth support, said fourth support being adjustably fixable with respect to said third support to incline the axis of rotation of said fifth support to the axis of rotation of said second support by an angle equal to the complement of the declination of said first body, and angular position data transmitters coupled between said fifth and fourth supports and between said vertical detector and said fifth support, whereby upon alignment of the optical axes of said first and second telescopes with said first and second bodies respectively and upon assumption of a vertical position by said vertical detector, the angular position of the vertical detector about its axis of rotation measures the complement of the latitude at the position of the instrument, and the angular position of the fifth support about its axis of rotation measures the local hour angle of said first body at the position of the instrument.

10. An instrument for celestial navigation comprising a base, a support mounted in a gimbal ring from said base for rotation with said ring about a first axis with respect to said base and for rotation with respect to said ring about a second axis perpendicular to said first axis, a housing mounted in the support for rotation with respect to the support about a third axis perpendicular to said second axis, an image-forming device mounted in the housing substantially on the third axis, a first photoelectric detector mounted in the housing substantially on the third axis and on the focal surface of the image-forming device, means to develop first and second error voltages representative in sign of components of the departure of the image of a first star in the image-forming device from the intersection of the third axis with said detector, said components being taken in planes respectively containing the second and third axes and the first and third axes, first and second servomechanisms energized by the first and second error signals respectively and coupled respectively between the gimbal ring and base and between the support and gimbal ring, whereby the housing is oriented to maintain the third axis substantially coincident with the line of sight to a first start, a second photoelectric detector movably mounted in the housing with its sensitive surface on the focal surface of the image-forming means, means to fix the second detector in the housing with a fourth axis defined by the image-forming means and second detector inclined to the third axis at a desired angle equal to the angular separation of selected first and second stars, means to develop a third error voltage representative in sign of the departure of the image of the second star as formed in the image-forming means from the plane defined by the third and fourth axes, a third servomechanism energized by the third error voltage and coupled between the support and housing for rotation of the housing with respect to the support about the third axis, means mounted in the housing defining a polar axis in a first plane parallel to the third axis, the polar axis defining means being adjustably fixable with respect to the housing to position the first plane at an inclination to the plane defined by the third and fourth axes equal to the angle between the great circle joining the first and second stars and the celestial meridian of the first star, the polar axis defining means being further adjustably fixable with respect to the housing to position the polar axis within the first plane at an inclination to the third axis equal to the complement of the declination of the first star, and a vertical detector supported from the polar axis defining means for rotation about the polar axis and about an axis perpendicular thereto, whereby upon alignment of the first and second detectors with the images of the first and second stars in the image-forming means and upon alignment of the vertical detector with the vertical direction, the polar axis will be parallel to the polar axis of the celestial sphere, the angle between the polar axis and the direction of the vertical will equal the complement of the latitude of the position of the instrument, and the dihedral angle between the plane defined by the polar axis and vertical direction and the plane defined by the polar axis and the third axis will equal the instantaneous local hour angle of the first star.

11. An instrument for celestial navigation comprising a base, a support mounted in a gimbal ring from said base for rotation with said ring about a first axis with respect to said base and for rotation with respect to said ring about a second axis perpendicular to said first axis, a housing mounted in the support for rotation about a third axis perpendicular to said second gimbal axis, an image-forming device mounted in the housing substantially on the third axis, a first photoelectric detector mounted in the housing substantially on the third axis and on the focal surface of the image-forming device, means to develop first and second error voltages representative in sign of components of the departure of the image of a first star in the image-forming device from the intersection of the third axis with said detector, said components being taken in planes respectively containing the second and third axes and the first and third axes, first and second servomechanisms energized by the first and second error signals respectively and coupled respectively between the gimbal ring and base and between the support and gimbal ring, a second photoelectric detector movably mounted in the housing with its sensitive surface on the focal surface of the image-forming means, means to fix the second detector with a fourth axis defined by the image-forming means and second detector inclined to the third axis at a desired angle, means to develop a third error voltage representative in sign of the departure of the image of a second star as formed in the image-forming means from the plane defined by the third and fourth axes, a third servomechanism energized by the third error voltage and coupled between the support and housing for rotation of the housing with respect to the support about the third axis, means mounted in the housing defining a polar axis in a first plane parallel to the third axis, the polar axis defining means being adjustably fixable with respect to the housing to position the first plane at an inclination to the plane defined by the third and fourth axes equal to the angle between the great circle joining the first and second stars and the celestial meridian of the first star, the polar axis defining means being further adjustably fixable with respect to the housing to position the polar axis within the first plane at an inclination to the third axis equal to the complement of the declination of the first star, and a vertical detector supported from the polar axis defining means for rotation about the polar axis and about an axis perpendicular thereto.

12. An instrument for celestial navigation comprising an image-forming device capable of forming on a spherical focal surface images of distant objects disposed over a wide angular field, a first photoelectric detector mounted in a gimbal suspension including a gimbal ring for universal motion about a first axis in which the gimbal ring rotates and about a second axis perpendicular to the first axis in which the first detector rotates with respect to the gimbal ring, said rotations sweeping the photosensitive surface of the first detector over a spherical surface adjacent to and concentric with said focal surface, means to develop first and second error voltages respectively representative in sign of the components of the departure of the image of a first star in the image-forming device from the intersection of a third axis passing through the first detector and through the intersection of the first and second axes, said components being taken in two planes respectively containing the second and third axes and the first and third axes, first and second servo systems energized by the first and second error voltages respectively and coupled respectively between a support fixed with respect to the image-forming device and the gimbal ring and between the gimbal ring and the first detector, whereby the first detector is maintained at the image of the first star in the image-forming device, the third axis passing through the center of the focal surface, a second photoelectric detector movably mounted with respect to the first detector with its sensitive surface adjacent the focal surface, means to fix the second detector with a fourth axis defined by it and by the center of the focal surface inclined to the third axis at an angle equal to the angular separation of selected first and second stars, means to develop a third error voltage representative in sign of the departure of the image of the second star in the image-forming device from the plane defined by the third and fourth axes, a third servomechanism energized by the third error voltage and coupled between the first and second detectors for rotation of the latter about the third axis, means defining a substitute plane parallel to the plane of the third and fourth axes, means coupled to said substitute-plane defining means defining a polar axis in a first plane parallel to the third axis, the polar axis defining means being adjustably fixable with respect to the substitute plane defining means to position the first plane at an inclination to the plane defined by the third and fourth axes equal to the angle between the great circle joining the first and second stars and the celestial meridian of the first star, the polar axis defining means being further adjustably fixable with respect to the substitute plane defining means to position the polar axis within the first plane at an inclination to the third axis equal to the complement of the declination of the first star, and a vertical detector supported from the polar axis defining means for rotation about the polar axis and about an axis perpendicular thereto.

13. An instrument for celestial navigation comprising a concave spherical mirror, a first optical detector and error signal generating system supported in gimbals for rotation with two degrees of freedom substantially about the center of curvature of the mirror, said rotations moving the first detector over a surface adjacent the focal surface of the mirror, said first detector and center of curvature defining a first optical axis, said first error signal generating system generating a reference voltage and an error voltage whose relative phase is representative of the angular displacement of the image of a selected primary star in said mirror from a prime direction in said first detector substantially tangent to said focal surface, separate drive means coupled one between said first detector and the ring of said gimbals and the other between said ring and mirror, means to energize said drive means with said error voltage, a second optical detector and error signal generating system, means to support said second detector adjacent said focal surface at an angular separation from said first detector subtended at said center of curvature equal to the angular separation of selected primary and secondary stars, said second detector and center of curvature defining a second optical axis, said second error generating system generating a reference voltage and a second error voltage the sign of whose phase difference is representative of the sense of the departure of the image of a selected secondary star in said mirror from the plane defined by said first and second optical axes, drive means energized by said second error voltage coupled between said second detector and the ring of said gimbals for rotation of said second detector about said first optical axis, means defining a substitute plane parallel to the plane of the first and second optical axes, means coupled to said substitute-plane defining means defining a polar axis in a first plane parallel to the first optical axis, the polar axis defining means being adjustably fixable with respect to the substitute plane defining means to position the first plane at an inclination to the plane defined by the first and second optical axes equal to the angle between the great circle joining the first and second stars and the celestial meridian of the first star, the polar axis defining means being further adjustably fixable with respect to the substitute plane defining means to position the polar axis within the first plane at an inclination to the first optical axis equal to the complement of the declination of the first star, and a vertical detector supported from the polar axis defining means for rotation about the polar axis and about an axis perpendicular thereto.

14. An instrument for navigation of a vehicle by reference to celestial bodies, said instrument comprising a base, two telescopes mounted together with two rotational degrees of freedom with respect to said base, first and second motors coupled to said telescopes for rotation thereof in said two degrees of freedom respectively, the second of said telescopes being mounted with its optical axis at an adjustably fixable inclination to an axis parallel to the optical axis of the first telescope, said second telescope being mounted with a single degree of freedom with respect to the first telescope by rotation about an axis parallel to the optical axis of the first telescope, a third motor coupled to said second telescope for rotation thereof about said axis parallel to the optical axis of the first telescope, a photoelectric tracking device associated with said first telescope, a servomechanism energized by error signals derived from said tracking device upon deviation of the optical axis of said first telescope from parallelism with the line of sight to a first chosen celestial body, a second photoelectric tracking device associated with said second telescope, a second servomechanism energized by error signals derived from said second tracking device upon deviation of the optical axis of said second telescope from alignment with a second chosen celestial body to restore said second telescope to alignment with said second body, means defining a polar axis in a first plane parallel to the optical axis of the first telescope, said means being adjustably fixable with respect to the second telescope to position said first plane at an angle to the plane defined by the optical axes of said telescopes equal to the angle between the great circle joining said bodies and the celestial meridian of the first of said bodies, said means being further adjustable to position said polar axis at an inclination to the optical axis of said first telescope equal to the complement of the declination of said first body, a vertical detector supported from said axis-defining means for rotation about said polar axis and about an axis perpendicular thereto, a source of collimated light supported on said vertical detector for rotation about an axis which is vertical upon alignment of said detector with the vertical, and photoelectric tracking means associated with said source including photoelectric elements fixedly mounted in said vehicle to maintain said source oriented with the direction of the light generated thereby parallel to a selected direction fixed with reference to the vehicle by the location therein of said photoelectric elements, whereby upon alignment of the optical axes of said first and second telescopes with the lines of sight to the first and second of said bodies respectively, upon alignment of the vertical detector with the vertical direction and upon alignment of the light generated by said source with said selected direction, the angular position of the source with respect to the vertical detector is a measure of the vehicle's heading.

15. An instrument for navigation of a vehicle by reference to celestial bodies, said instrument comprising a base, two telescopes mounted together with two rotational degrees of freedom with respect to said base, first and second motors coupled to said telescopes for rotation thereof in said two degrees of freedom respectively, the second of said telescopes being mounted with its optical axis at an adjustably fixable inclination to an axis parallel to the optical axis of the first telescope, said second telescope being mounted with a single degree of freedom with respect to the first telescope by rotation about an axis parallel to the optical axis of the first telescope, a third motor coupled to said second telescope for rotation thereof about said axis parallel to the optical axis of the first telescope, a photoelectric tracking device associated with said first telescope, a servomechanism energized by error signals derived from said tracking device upon deviation of the optical axis of said first telescope from parallelism with the line of sight to a first chosen celestial body, a second photoelectric tracking device associated with said second telescope, a second servomechanism energized by error signals derived from said second tracking device upon deviation of the optical axis of said second telescope from alignment with a second chosen celestial body to restore said second telescope to alignment with said second body, means defining a polar axis in a first plane parallel to the optical axis of the first telescope, said means being adjustably fixable with respect to the second telescope to position said first plane at an angle to the plane defined by the optical axes of said telescopes equal to the angle between the great circle joining said bodies and the celestial meridian of the first of said bodies, said means being further adjustable to position said polar axis at an inclination to the optical axis of said first telescope equal to the complement of the declination of said first body, a vertical detector supported from said axis-defining means for rotation about said polar axis and about an axis perpendicular thereto, two-part photoelectric tracking means including in one part a source of collimated light having a collimation axis with respect to said one part and in the other part a photoelectric detector of light collimated along a collimation axis with respect to said other part, one of said parts being fixed in the vehicle and the other of said parts being mounted on said vertical detector for rotation about an axis which is vertical upon alignment of the vertical detector with the vertical, and a third servomechanism energized by error signals from said two-part tracking means upon deviation of the axes of collimation of said two parts from parallelism to restore said collimation axes to parallelism, whereby upon alignment of the optical axes of said first and second telescopes with the lines of sight to said first and second bodies respectively, upon alignment of the vertical detector with the vertical and upon parallel alignment of the axes of collimation of the parts of said two-part tracking means, the angular position of said one part about its axis of rotation with respect to the vertical detector is a measure of the true heading of the vehicle.

References Cited in the file of this patent

FOREIGN PATENTS

| | | |
|---|---|---|
| 150,125 | Great Britain | Sept. 2, 1920 |
| 610,561 | Great Britain | Oct. 18, 1948 |